United States Patent
Okubo

(10) Patent No.: US 11,373,437 B2
(45) Date of Patent: Jun. 28, 2022

(54) IMAGE PROCESSING DEVICE, IMAGE PROCESSING METHOD, AND PROGRAM

(71) Applicant: SONY CORPORATION, Tokyo (JP)

(72) Inventor: Atsushi Okubo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/255,759

(22) PCT Filed: Jun. 10, 2019

(86) PCT No.: PCT/JP2019/022881
§ 371 (c)(1),
(2) Date: Dec. 23, 2020

(87) PCT Pub. No.: WO2020/021879
PCT Pub. Date: Jan. 30, 2020

(65) Prior Publication Data
US 2021/0271848 A1  Sep. 2, 2021

(30) Foreign Application Priority Data

Jul. 24, 2018 (JP) .............................. JP2018-138195

(51) Int. Cl.
*G06V 40/13* (2022.01)
*G06V 40/12* (2022.01)
*G06T 7/246* (2017.01)

(52) U.S. Cl.
CPC .......... *G06V 40/1335* (2022.01); *G06T 7/246* (2017.01); *G06V 40/1318* (2022.01); *G06V 40/1365* (2022.01)

(58) Field of Classification Search
CPC .............................. G06K 9/0004; G06F 3/048
See application file for complete search history.

(56) References Cited

U.S. PATENT DOCUMENTS

2004/0208347 A1* 10/2004 Baharav ............. G06K 9/00046
382/124
2016/0239701 A1* 8/2016 Lee ..................... G06K 9/00026

FOREIGN PATENT DOCUMENTS

| JP | 2009-165630 A | 7/2009 |
| JP | 2010-240215 A | 10/2010 |
| JP | 2014-119825 A | 6/2014 |

* cited by examiner

*Primary Examiner* — Joseph R Haley
(74) *Attorney, Agent, or Firm* — Paratus Law Group, PLLC

(57) ABSTRACT

A device and a method are provided which perform movement vector calculation processing from photographing images for which a microlens array is used without generating whole images. Specifically, consecutive photographing images photographed by an imaging section having a microlens array are input, and a movement vector between the images is calculated. A movement vector calculating section calculates the movement vector corresponding to a feature point by using microlens photographing images photographed by respective microlenses. When the movement vector corresponding to the feature point within duplicate image regions having the same image region within a plurality of microlens photographing images is calculated, an average value of a plurality of movement vectors corresponding to the same feature point is calculated and is set as the movement vector of the feature point. Alternatively, an average value of plural movement vectors remaining after an outlier (abnormal value) is excluded is calculated and is set as the movement vector of the feature point.

18 Claims, 27 Drawing Sheets

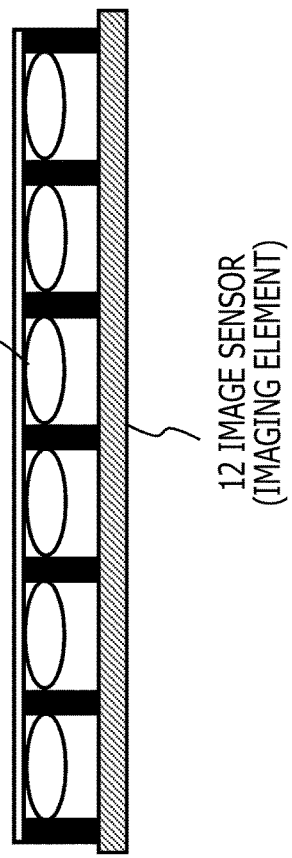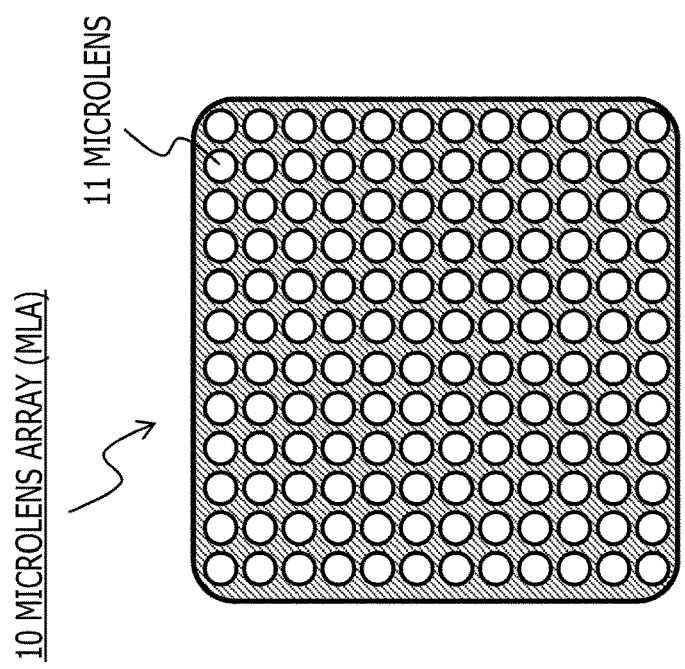
FIG. 1

FIG. 5
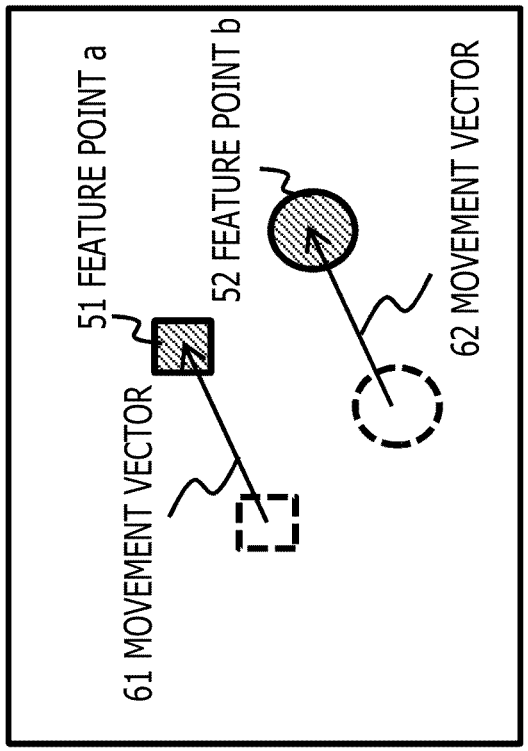
(2) SINGLE-LENS CAMERA
PHOTOGRAPHING IMAGE @t2
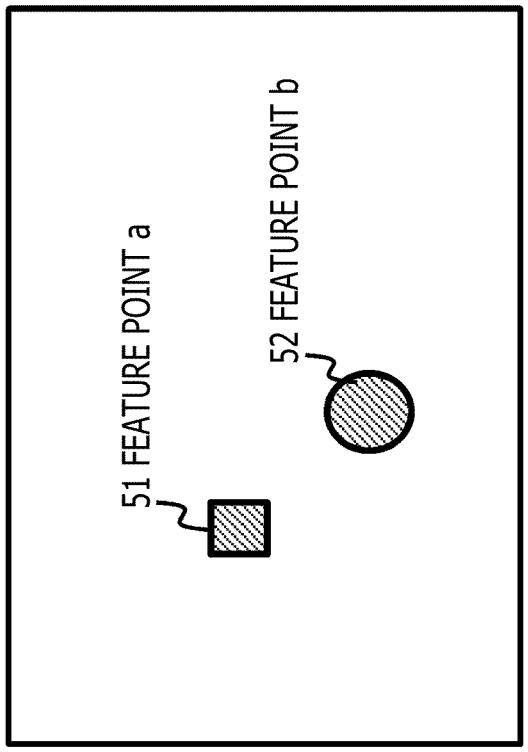
(1) SINGLE-LENS CAMERA
PHOTOGRAPHING IMAGE @t1

FIG. 9

MOVEMENT VECTOR CALCULATION PROCESSING FOR
(1) SINGLE IMAGE REGION = CENTRAL REGION OF MICROLENS PHOTOGRAPHING IMAGE
(ONLY ONE MOVEMENT VECTOR CORRESPONDING TO IDENTICAL FEATURE POINT CAN BE DETECTED)

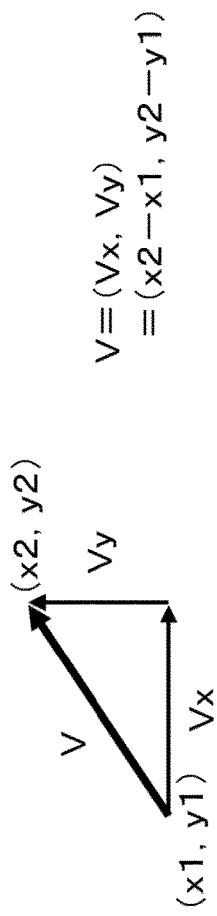

$V = (V_x, V_y)$
$= (x2-x1, y2-y1)$

MOVEMENT VECTOR CALCULATION PROCESSING FOR
(2) TWO-IMAGE DUPLICATE REGIONS = EDGE REGIONS (EXCLUDING FOUR VERTEX REGIONS) OF MICROLENS PHOTOGRAPHING IMAGE
(TWO MOVEMENT VECTORS CORRESPONDING TO IDENTICAL FEATURE POINT CAN BE DETECTED)

(S51) CALCULATE AVERAGE VALUE $\overline{V} = (\overline{V_x}, \overline{V_y})$ OF TWO MOVEMENT VECTORS CORRESPONDING TO TWO IDENTICAL FEATURE POINTS $$\overline{v_x} = \frac{1}{2}\sum_{i=1}^{2} v_{x_i} \qquad \overline{v_y} = \frac{1}{2}\sum_{i=1}^{2} v_{y_i}$$

AVERAGE VALUE $\overline{V} = (\overline{V_x}, \overline{V_y})$ IS SET AS MOVEMENT VECTOR

FIG. 10

MOVEMENT VECTOR CALCULATION PROCESSING FOR
(3) FOUR-IMAGE DUPLICATE REGIONS = FOUR VERTEX VICINITY REGIONS OF MICROLENS PHOTOGRAPHING IMAGE
(FOUR MOVEMENT VECTORS CORRESPONDING TO IDENTICAL FEATURE POINT CAN BE DETECTED)

(S71) CALCULATE AVERAGE VALUE $\overline{V} = (\overline{V_x}, \overline{V_y})$ OF FOUR MOVEMENT VECTORS CORRESPONDING TO FOUR IDENTICAL FEATURE POINTS $$\overline{v_x} = \frac{1}{4}\sum_{i=1}^{4} v_{xi} \qquad \overline{v_y} = \frac{1}{4}\sum_{i=1}^{4} v_{yi}$$

(S72) OUTLIER (ABNORMAL VALUE) EXCLUSION PROCESSING

WHERE $(\delta_{xi} = v_{xi} - \overline{v_x}, \; \delta_{yi} = v_{yi} - \overline{v_y} \; (i=1,\ldots,4)$ i SATISFYING $(\sqrt{\delta_{xi}^2 + \delta_{yi}^2} > \delta_{th})$ IS SET AS OUTLIER (S73) EXCLUDE OUTLIER (ABNORMAL VALUE), AND CALCULATE AVERAGE VALUE AGAIN $\overline{V} = (\overline{V_x}, \overline{V_y})$ OF REMAINING MOVEMENT VECTORS AFTER EXCLUSION OF OUTLIER (ABNORMAL VALUE), AVERAGE VALUE $\overline{V} = (\overline{V_x}, \overline{V_y})$ IS SET AS MOVEMENT VECTOR FIG. 11
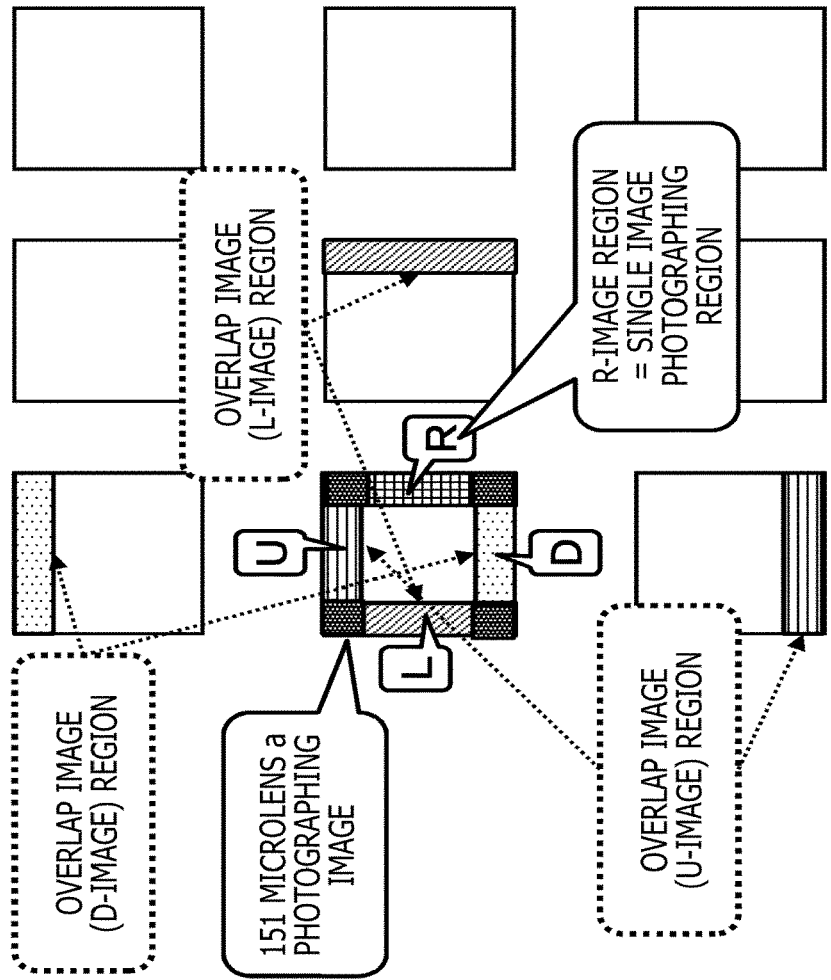
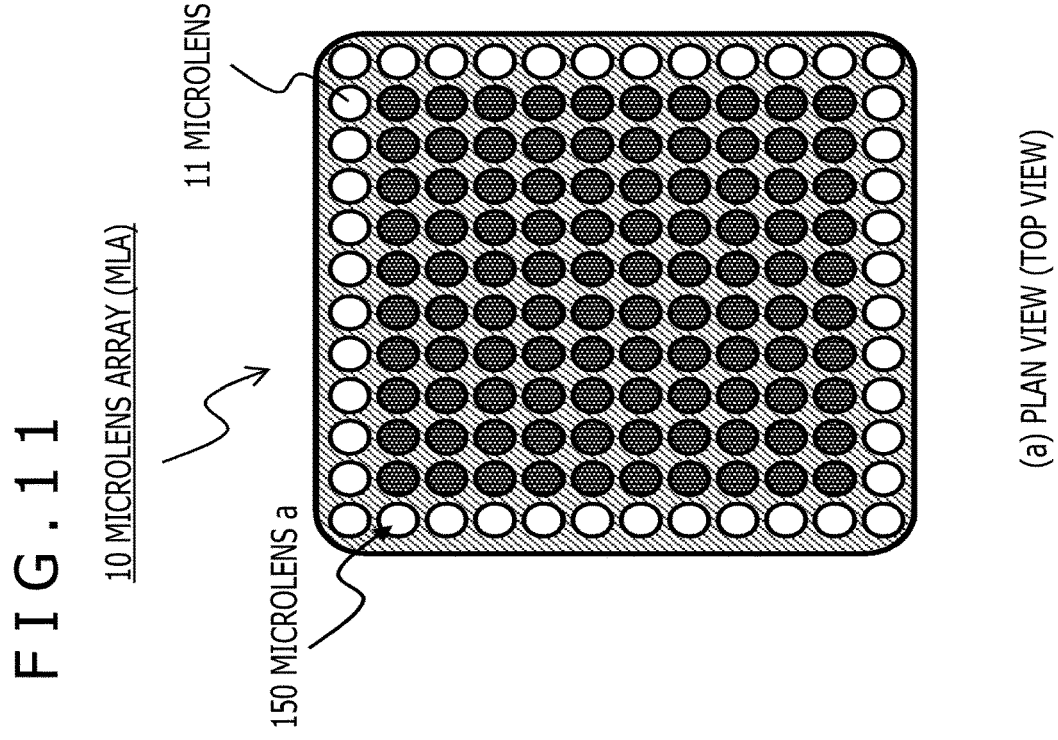
(a) PLAN VIEW (TOP VIEW)

FIG.12
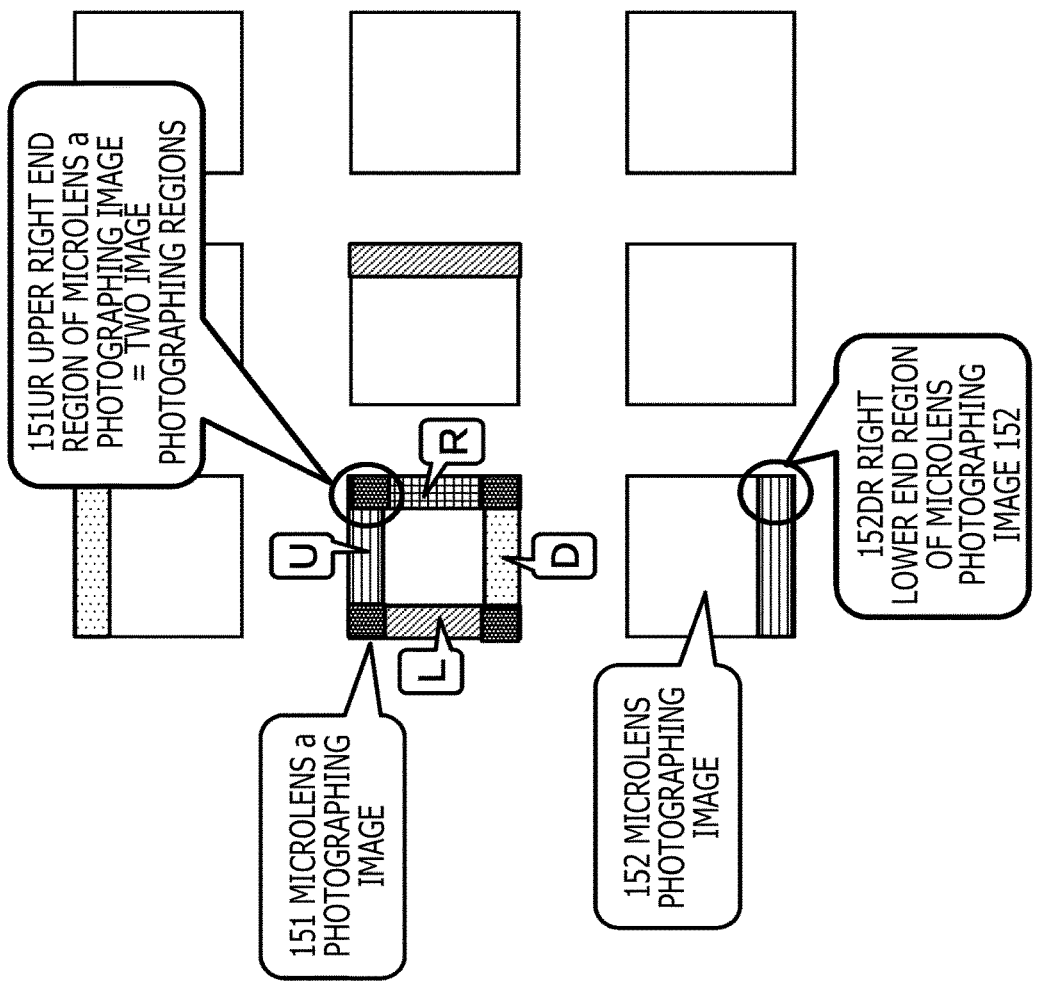
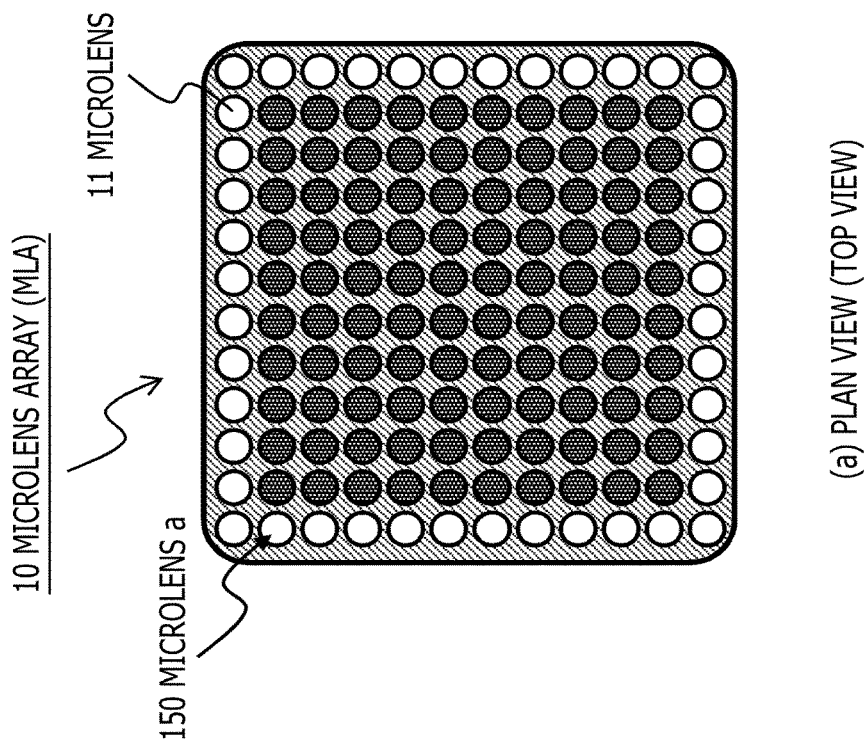
(a) PLAN VIEW (TOP VIEW)

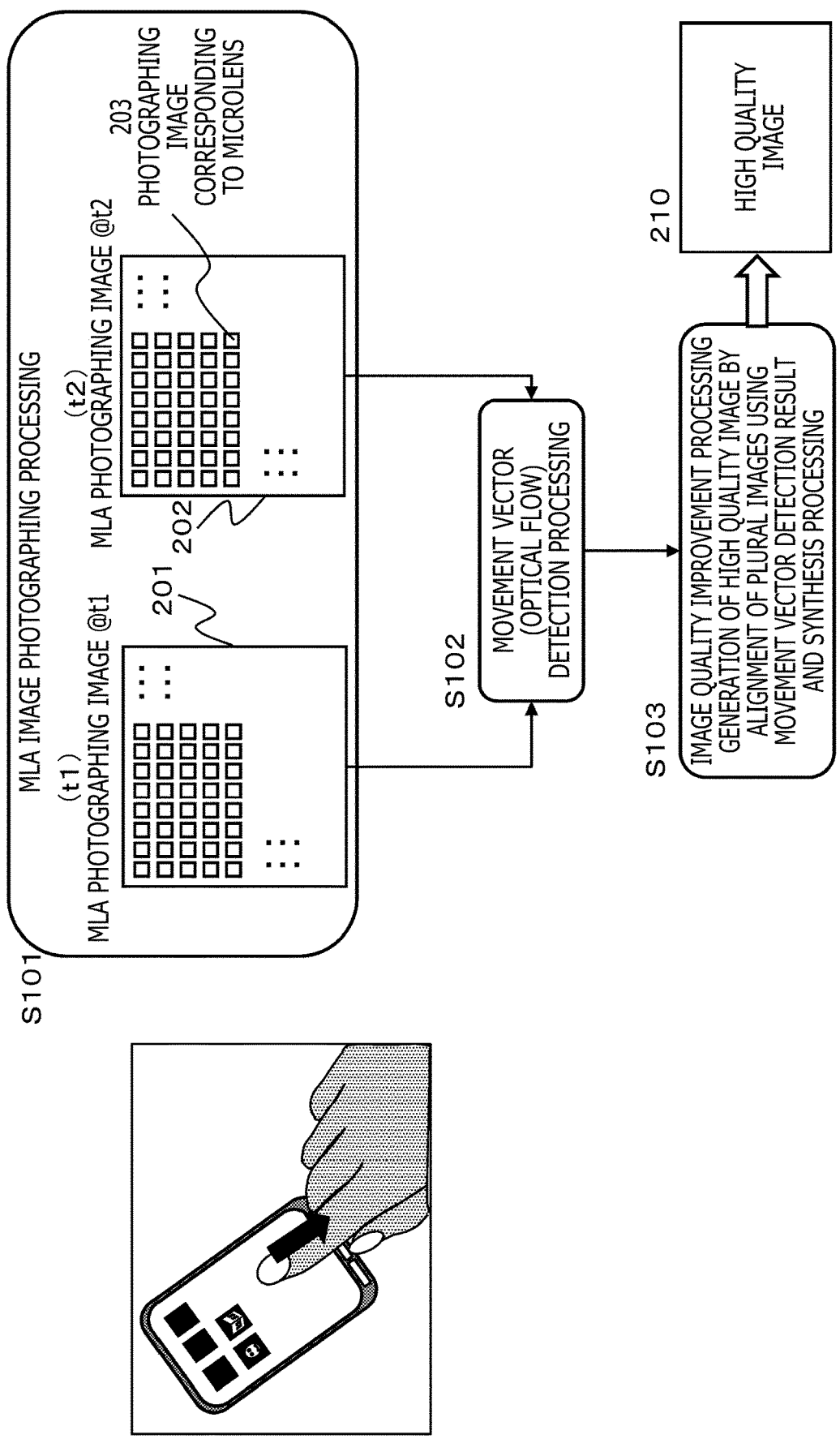

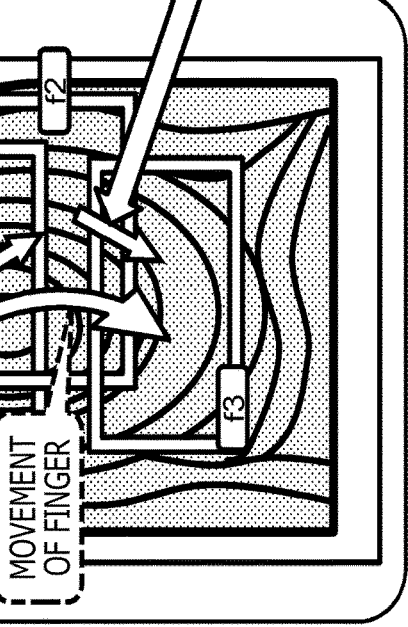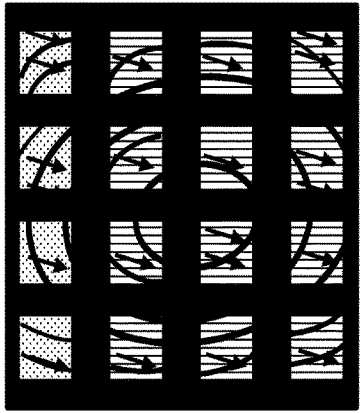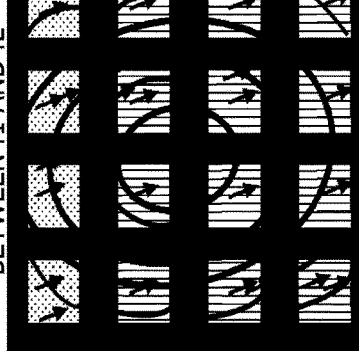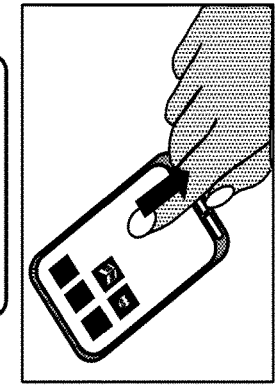

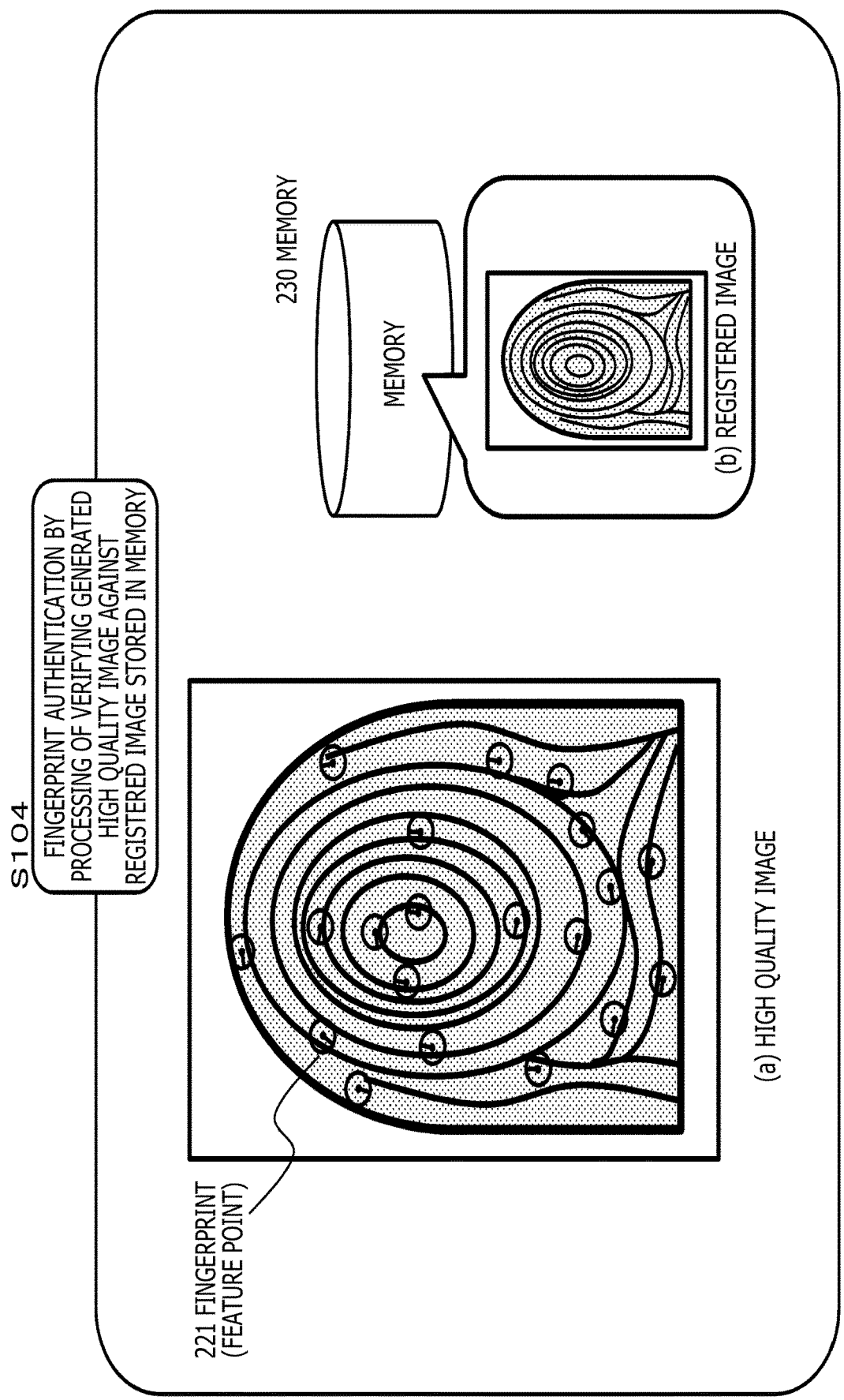

FIG. 25
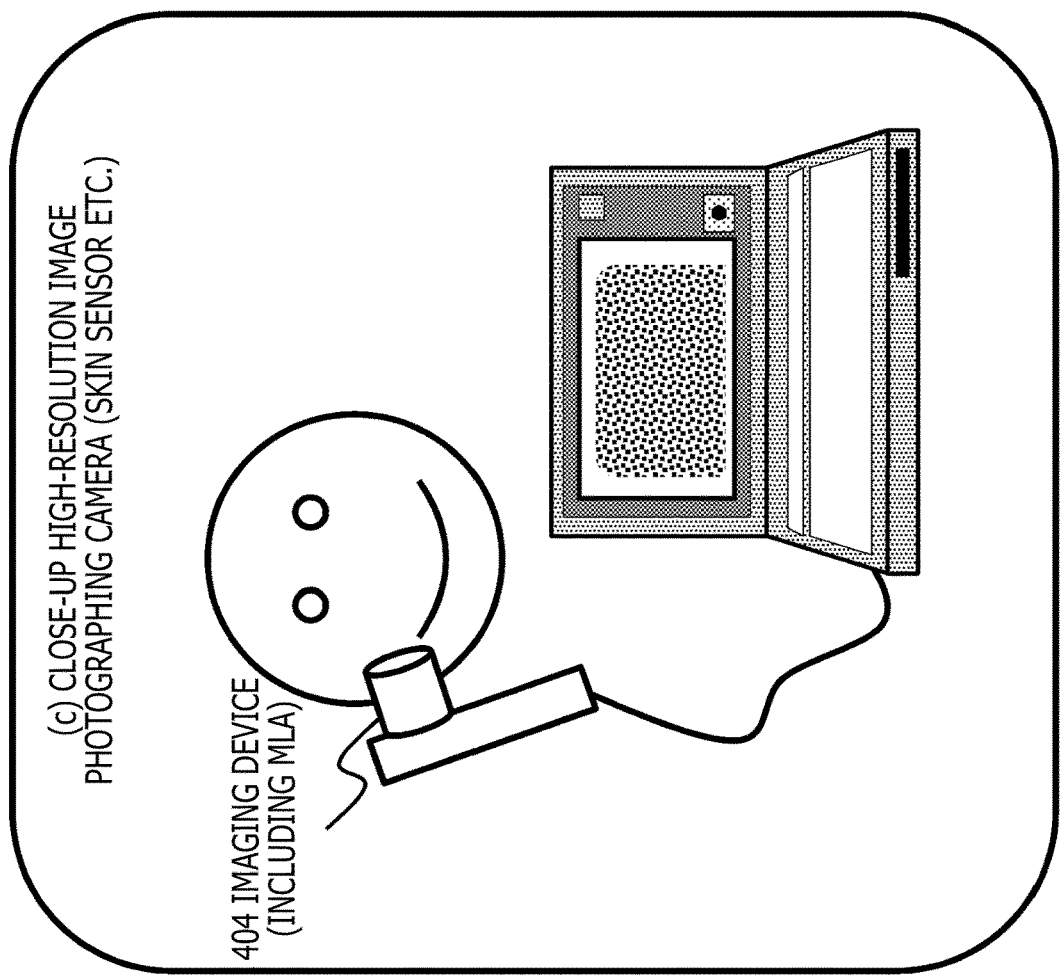
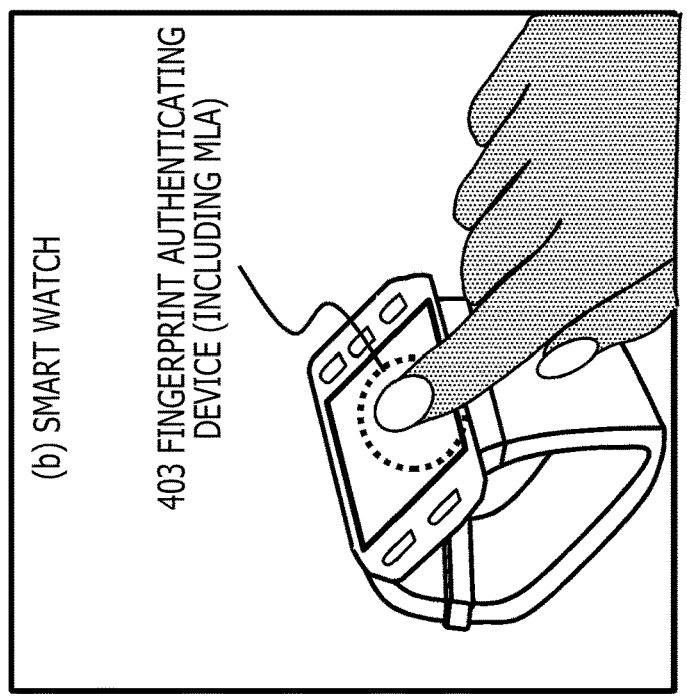

IMAGE PROCESSING DEVICE, IMAGE PROCESSING METHOD, AND PROGRAM

CROSS REFERENCE TO PRIOR APPLICATION

This application is a National Stage Patent Application of PCT International Patent Application No. PCT/JP2019/022881 (filed on Jun. 10, 2019) under 35 U.S.C. § 371, which claims priority to Japanese Patent Application No. 2018-138195 (filed on Jul. 24, 2018), which are all hereby incorporated by reference in their entirety.

TECHNICAL FIELD

The present disclosure relates to an image processing device, an image processing method, and a program. The present disclosure particularly relates to an image processing device, an image processing method, and a program that detect a movement vector (optical flow) from photographing images of an imaging device using a microlens array (MLA: Micro Lens Array).

BACKGROUND ART

An imaging device using a microlens array (MLA: Micro Lens Array) in which a plurality of microlenses is arranged is known. A distance between a lens and an imaging element (image sensor) can be reduced by using the microlens array (MLA), so that a thin imaging device can be configured.

The imaging device can be mounted in a thin apparatus such as a smartphone and is estimated to be used widely in the future. Incidentally, PTL 1 (Japanese Patent Laid-Open No. 2010-240215), for example, describes an imaging device using a microlens array (MLA).

There is a fingerprint authenticating device of an electronic apparatus such as a smartphone, as a concrete example of usage of an imaging device using a microlens array (MLA).

A sequence of fingerprint authentication processing is, for example, the following processing. First, a moving image of a finger of a user is photographed. Next, alignment of a plurality of consecutive photographing images included in the moving image is performed, and the images after the alignment are synthesized to generate a high quality image. Finally, processing of verifying the generated high quality image against registered fingerprint data registered in a memory in advance is performed.

The synthesis of the plural images is performed because, for example, only one still image has insufficient characteristic information of the finger and thus decreases authentication accuracy. The synthesis of the plurality of consecutive photographing images needs the alignment of the plurality of consecutive photographing image frames. This alignment needs the processing of calculating the movement vector of a feature point included in the images.

However, in the microlens array (MLA) imaging device, an image photographed by the imaging element is represented by a large number of images corresponding to the respective microlenses included in the array. Hence, before the movement vector calculation processing and the alignment processing described above are performed, one whole image needs to be generated by combining the large number of images photographed by the imaging element.

However, the large number of images corresponding to the respective microlenses are all images inverted vertically and horizontally, and in many cases, overlap image regions photographed in a duplicate manner are present in one microlens photographing image and adjacent microlens photographing images.

Hence, the generation of one whole image needs a large number of pieces of processing that include, for example, performing vertical and horizontal inversion processing of each of a large number of microlens photographing images corresponding to the respective microlenses included in the array, performing an image cutout that detects overlap regions of each image and deletes the overlap images, and combining the images after the cutout with one another.

In order to generate a synthetic image of a high quality, these pieces of processing need to be performed in each frame unit of the plurality of consecutive photographing images, so that a processing time and a processing load become enormous.

CITATION LIST

Patent Literature

[PTL 1]
Japanese Patent Laid-Open No. 2010-240215

SUMMARY

Technical Problems

The present disclosure has been made in view of the above-described problems, for example. It is an object of the present disclosure to provide an image processing device, an image processing method, and a program that make it possible to perform efficient movement vector (optical flow) detection from photographing images for which a microlens array (MLA) imaging device is used.

In addition, in one embodiment of the present disclosure, it is an object to provide an image processing device, an image processing method, and a program that make it possible to perform efficient movement vector (optical flow) detection from photographing images for which a microlens array (MLA) imaging device is used, and generate a high quality image.

Solution to Problems

According to a first aspect of the present disclosure, there is provided an image processing device including:
a movement vector calculating section configured to receive, as an input, consecutive photographing images of an imaging section having a microlens array and calculate a movement vector between the images,
the movement vector calculating section calculating the movement vector corresponding to a feature point by using microlens photographing images photographed by respective microlenses included in the microlens array.

Further, according to a second aspect of the present disclosure, there is provided an image processing device for performing fingerprint authentication processing, the image processing device including:
a movement vector calculating section configured to receive, as an input, consecutive photographing images of a finger photographed by an imaging section having a microlens array and calculate a movement vector between the images;
an image synthesizing section configured to generate a high quality image by synthesis processing of the consecutive photographing images by using the movement vector calculated by the movement vector calculating section; and an image verifying section configured to perform processing of verifying a synthetic image generated by the image synthesizing section against a registered fingerprint image stored in a storage section in advance.

Further, according to a third aspect of the present disclosure, there is provided an image processing method performed in an image processing device, the image processing method including:

by a movement vector calculating section, a movement vector calculating step of receiving, as an input, consecutive photographing images of an imaging section having a microlens array and calculating a movement vector between the images, in which the movement vector calculating step includes a step of calculating the movement vector corresponding to a feature point by using microlens photographing images photographed by respective microlenses included in the microlens array.

Further, according to a fourth aspect of the present disclosure, there is provided an image processing method for performing fingerprint authentication processing in an image processing device, the image processing method including:

by a movement vector calculating section, a movement vector calculating step of receiving, as an input, consecutive photographing images of a finger photographed by an imaging section having a microlens array and calculating a movement vector between the images;

by an image synthesizing section, an image synthesizing step of generating a high quality image by synthesis processing of the consecutive photographing images by using the movement vector calculated by the movement vector calculating section; and by an image verifying section, an image verifying step of performing processing of verifying a synthetic image generated by the image synthesizing section against a registered fingerprint image stored in a storage section in advance.

Further, according to a fifth aspect of the present disclosure, there is provided a program for making image processing performed in an image processing device, the program including:

making a movement vector calculating section perform a movement vector calculating step of receiving, as an input, consecutive photographing images of an imaging section having a microlens array and calculating a movement vector between the images, in which in the movement vector calculating step, processing of calculating the movement vector corresponding to a feature point by using microlens photographing images photographed by respective microlenses included in the microlens array is made to be performed.

Further, according to a sixth aspect of the present disclosure, there is provided a program for making fingerprint authentication processing performed in an image processing device, the program including:

making a movement vector calculating section perform a movement vector calculating step of receiving, as an input, consecutive photographing images of a finger photographed by an imaging section having a microlens array and calculating a movement vector between the images;

making an image synthesizing section perform an image synthesizing step of generating a high quality image by synthesis processing of the consecutive photographing images by using the movement vector calculated by the movement vector calculating section; and making an image verifying section perform an image verifying step of performing processing of verifying a synthetic image generated by the image synthesizing section against a registered fingerprint image stored in a storage section in advance.

Incidentally, the programs according to the present disclosure are, for example, programs that can be provided by a storage medium or a communication medium provided in a computer readable form to an information processing device or a computer system capable of executing various program codes. Processing corresponding to the programs is implemented on the information processing device or the computer system by providing such programs in a computer readable form.

Still other objects, features, and advantages of the present disclosure will become apparent from more detailed description based on embodiments of the present disclosure to be described later and the accompanying drawings. Incidentally, a system in the present specification is a logical set configuration of a plurality of devices and is not limited to a system in which the devices of respective configurations are located within the same casing.

Advantageous Effects of Invention

According to a configuration based on one embodiment of the present disclosure, a device and a method are implemented which perform movement vector calculation processing from photographing images for which a microlens array is used without generating whole images.

Specifically, for example, consecutive photographing images photographed by an imaging section having a microlens array are input, and a movement vector between the images is calculated. A movement vector calculating section calculates the movement vector corresponding to a feature point by using microlens photographing images photographed by respective microlenses. When the movement vector corresponding to the feature point within duplicate image regions having the same image region within a plurality of microlens photographing images is calculated, an average value of a plurality of movement vectors corresponding to the same feature point is calculated and is set as the movement vector of the feature point. Alternatively, an average value of plural movement vectors remaining after an outlier (abnormal value) is excluded is calculated and is set as the movement vector of the feature point.

A device and a method that perform movement vector calculation processing from photographing images for which a microlens array is used without generating whole images are implemented by these pieces of processing.

It is to be noted that effects described in the present specification are merely illustrative and are not limited, and that there may be additional effects.

BRIEF DESCRIPTION OF DRAWINGS

FIG. 1 is a diagram of assistance in explaining an example of a configuration of an imaging device having a microlens array (MLA).

FIG. 5 is a diagram of assistance in explaining movement vector calculation processing.

FIG. 9 is a diagram of assistance in explaining movement vector calculation processing based on photographing images of the microlens array (MLA) imaging device which processing is performed by the image processing device according to the present disclosure.

FIG. 10 is a diagram of assistance in explaining movement vector calculation processing based on photographing images of the microlens array (MLA) imaging device which processing is performed by the image processing device according to the present disclosure.

FIG. 11 is a diagram of assistance in explaining movement vector calculation processing based on photographing images of the microlens array (MLA) imaging device which processing is performed by the image processing device according to the present disclosure.

FIG. 12 is a diagram of assistance in explaining movement vector calculation processing based on photographing images of the microlens array (MLA) imaging device which processing is performed by the image processing device according to the present disclosure.

FIG. 15 is a diagram of assistance in explaining a fingerprint authentication processing sequence performed by the image processing device according to the present disclosure.

FIG. 16 is a diagram of assistance in explaining the fingerprint authentication processing sequence performed by the image processing device according to the present disclosure.

FIG. 17 is a diagram of assistance in explaining the fingerprint authentication processing sequence performed by the image processing device according to the present disclosure.

FIG. 25 is a diagram of assistance in explaining concrete examples of devices that perform the movement vector calculation processing according to the present disclosure.

DESCRIPTION OF EMBODIMENTS

Figure 2:
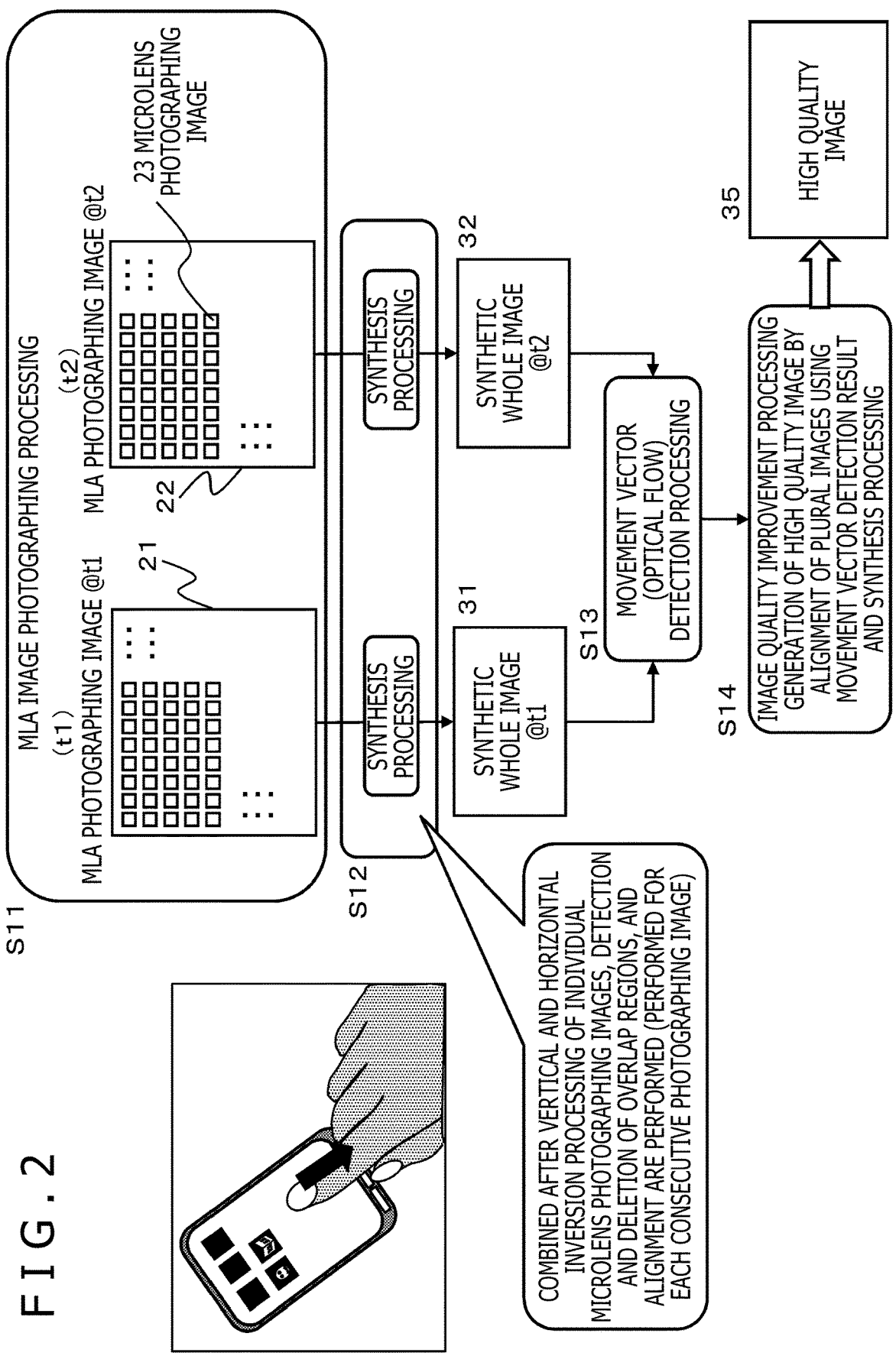
FIG. 2 is a diagram of assistance in explaining an example of fingerprint authentication processing using the imaging device having the microlens array (MLA).

In the following, referring to the drawings, description will be made of details of an image processing device, an image processing method, and a program according to the present disclosure.

Incidentally, the description will be made according to the following items.

1. Microlens Array Imaging Device
2. Fingerprint Authentication Processing Using Microlens Array Imaging Device and Problems Thereof
3. Movement Vector Calculation Processing in Image Processing Device according to Present Disclosure
4. Fingerprint Authentication Processing to which Image Processing Device according to Present Disclosure is Applied
5. Examples of Configuration and Processing Sequences of Image Processing Devices according to Present Disclosure
6. Concrete Device Examples Using Movement Vector Calculation Processing according to Present Disclosure
7. Example of Hardware Configuration of Image Processing Device
8. Summary of Configuration according to Present Disclosure

[1. Microlens Array Imaging Device]

A microlens array imaging device will first be described with reference to FIG. 1 and following figures.

A microlens array (MLA: Micro Lens Array) imaging device is an imaging device in which a plurality of microlenses is arranged.

FIG. 1 illustrates (a) a plan view (top view) and (b) a sectional view of a microlens array imaging device. As illustrated in (a) the plan view (top view), a large number of small lenses are mounted on the upper surface of the microlens array imaging device. That is, a microlens array (MLA: Micro Lens Array) 10 in which microlenses are arranged is formed.

As illustrated in the (b) sectional view, light incident via microlenses 11 included in the microlens array (MLA) 10 is applied to and imaged by an image sensor (imaging element) 12.

In the image sensor (imaging element) 12, photographing images of the respective microlenses 11 included in the microlens array (MLA) 10 are generated individually.

[2. Fingerprint Authentication Processing Using Microlens Array Imaging Device and Problems Thereof]

Fingerprint authentication processing using the microlens array imaging device and problems thereof will next be described with reference to FIG. 2 and following figures.

FIG. 2 is a diagram of assistance in explaining a sequence of fingerprint authentication processing using the microlens array (MLA) imaging device.

The sequence of the fingerprint authentication processing is, for example, the processing of steps S11 to S14 illustrated in FIG. 2.

First, a moving image of a finger of a user is photographed in step S11.

FIG. 2 illustrates a microlens array (MLA) photographing image @t1, 21 photographed at time (t1) and a microlens array (MLA) photographing image @t2, 22 photographed at time (t2). Incidentally, while an example of processing using two consecutive photographing images will be described in the following, three or more consecutive photographing images may also be photographed and used.

Each of quadrangles illustrated within the microlens array (MLA) photographing images 21 and 22 illustrated in step S11 in FIG. 2 is one microlens photographing image 23.

As described earlier, in the microlens array (MLA) imaging device, an image photographed by the imaging element is represented by a large number of images corresponding to the respective microlenses included in the array.

In next step S12, synthesis processing of each of the microlens array (MLA) photographing images 21 and 22 is performed.

The individual microlens photographing images 23 included in the microlens array (MLA) photographing images 21 and 22 are all images inverted vertically and horizontally. Further, in many cases, one microlens photographing image and adjacent microlens photographing images have overlap image regions photographed in a duplicate manner.

Hence, in order to generate one whole image by the synthesis processing of step S12, a large number of pieces of processing are necessary, which include performing vertical and horizontal inversion processing of each of the microlens photographing images corresponding to the respective microlenses included in the array, performing an image cutout that detects overlap regions of each image and deletes the overlap images, and combining the images after the cutout with one another, for example.

This processing needs to be performed for each of the microlens array (MLA) photographing images 21 and 22 as consecutive photographing images.

As a result of this synthesis processing, two whole images, that is, a synthetic whole image @t1, 31 and a synthetic whole image @t2, 32, are generated. These images are images of the finger consecutively photographed at time t1 and time t2.

By using the two images, that is, the synthetic whole image @t1, 31 and the synthetic whole image @t2, 32, step S13 performs processing of detecting a movement vector (optical flow) of a feature point within the images.

This is processing of finding the feature point estimated to be a common subject from the synthetic whole image @t1, 31 and the synthetic whole image @t2, 32, and calculating an amount of movement and a moving direction between the two images.

Next, step S14 performs alignment between the two images, that is, the synthetic whole image @t1, 31 and the synthetic whole image @t2, 32, on the basis of the movement vector calculated in step S13, and generates a high quality image by synthesis processing of the two images. For example, alpha blending processing of pixel values of respective corresponding pixels or the like is performed to generate a clearer high quality image.

A high quality image 35 having clear fingerprint information of the finger or the like is generated as a result of this processing.

Though not illustrated in the figure, processing of verifying the high quality image 35 against fingerprint data registered in a memory in advance is finally performed.

The synthesis of the plural images is performed because, for example, only one still image has insufficient characteristic information of the finger and thus decreases authentication accuracy. The synthesis of a plurality of consecutive photographing images needs the alignment of the plurality of consecutive photographing image frames. This alignment needs the processing of calculating the movement vector (optical flow) of a feature point included in the images.

Processing using the two consecutively photographed whole images is performed in the calculation of the movement vector (optical flow) in step S13. The synthesis processing of step S12 is performed for this whole image generation processing.

As described above, the generation of one whole image needs vertical and horizontal inversion processing performed for each of the microlens photographing images corresponding to the respective microlenses included in the microlens array (MLA).

Further, in many cases, overlap image regions are present in each of the microlens photographing images included in the microlens array (MLA). Hence, high-load processing is necessary, which includes performing an image cutout that detects overlap regions of each image and deletes the overlap images and combining the images after the cutout with one another.

Figure 3:
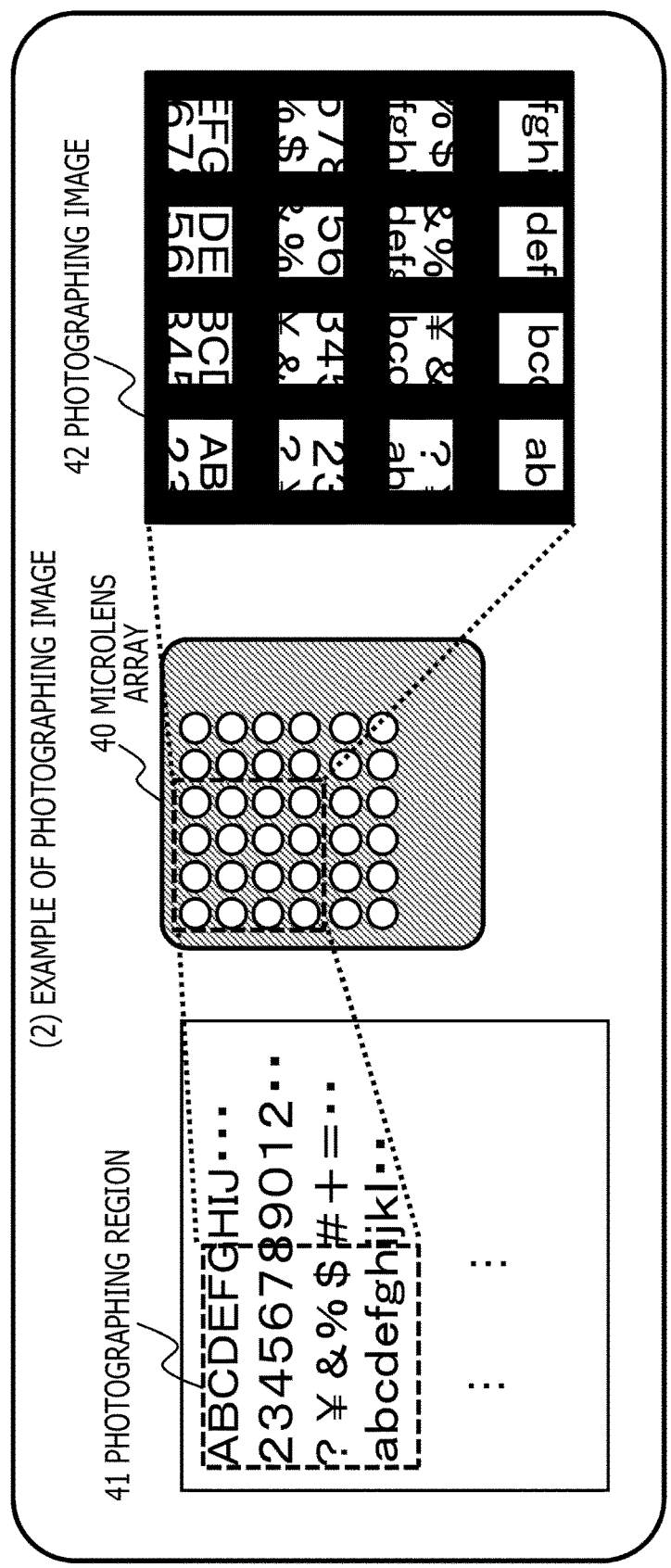
FIG. 3 is a diagram of assistance in explaining a photographing image of the imaging device having the microlens array (MLA).

Referring to FIG. 3, description will be made of overlap image regions occurring in the images corresponding to the respective microlenses included in the microlens array (MLA).

FIG. 3(1) illustrates (b) a sectional view of a microlens array imaging device similar to that described with reference to FIG. 1(b). A part of light incident on a microlens included in the microlens array (MLA) includes a region overlapping light incident on an adjacent microlens. As a result, overlap image regions photographed in a duplicate manner occur in one microlens photographing image and an adjacent microlens photographing image.

FIG. 3(2) illustrates a microlens array 40, a photographing region 41, and a photographing image 42. The photographing region 41 includes alphabetic characters, numerical values, and symbols. The photographing image 42 is a result of photographing the photographing region 41. The photographing image 42 represents 16 microlens photographing images of 4×4 microlenses in an upper left portion of the microlens array 40.

As is understood from the photographing image 42 in FIG. 3(2), each of the microlens photographing images included in the photographing image 42 is photographed as an image inverted vertically and horizontally. Further, overlap image regions photographed in a duplicate manner occur in one microlens photographing image and adjacent microlens photographing images.

For example, a substantially whole image of an alphabetic character image "A, B" and a part of a numerical value image "2, 3" are photographed in a microlens photographing image at an upper left end of the photographing image 42. An image of half of an alphabetic character image "B" is photographed in an adjacent microlens photographing image on the right of the microlens photographing image at the upper left end. That is, at least a part of the alphabetic character image "B" is an overlap image photographed in both images of the two microlens photographing images.

In addition, approximately an upper half of the numerical value image "2, 3" is photographed in the microlens photographing image at the upper left end of the photographing image 42, while more than half of a lower portion of the numerical value image "2, 3" is photographed in an adjacent microlens photographing image below the microlens photographing image at the upper left end. That is, at least a part of the image "2, 3" is an overlap image photographed in both images of the two microlens photographing images.

Manners of occurrence of overlap images in microlens photographing images will be described with reference to FIG. 4.

Overlap image regions occurring in one microlens photographing image 45 illustrated in FIG. 4 will be described.

Figure 4:
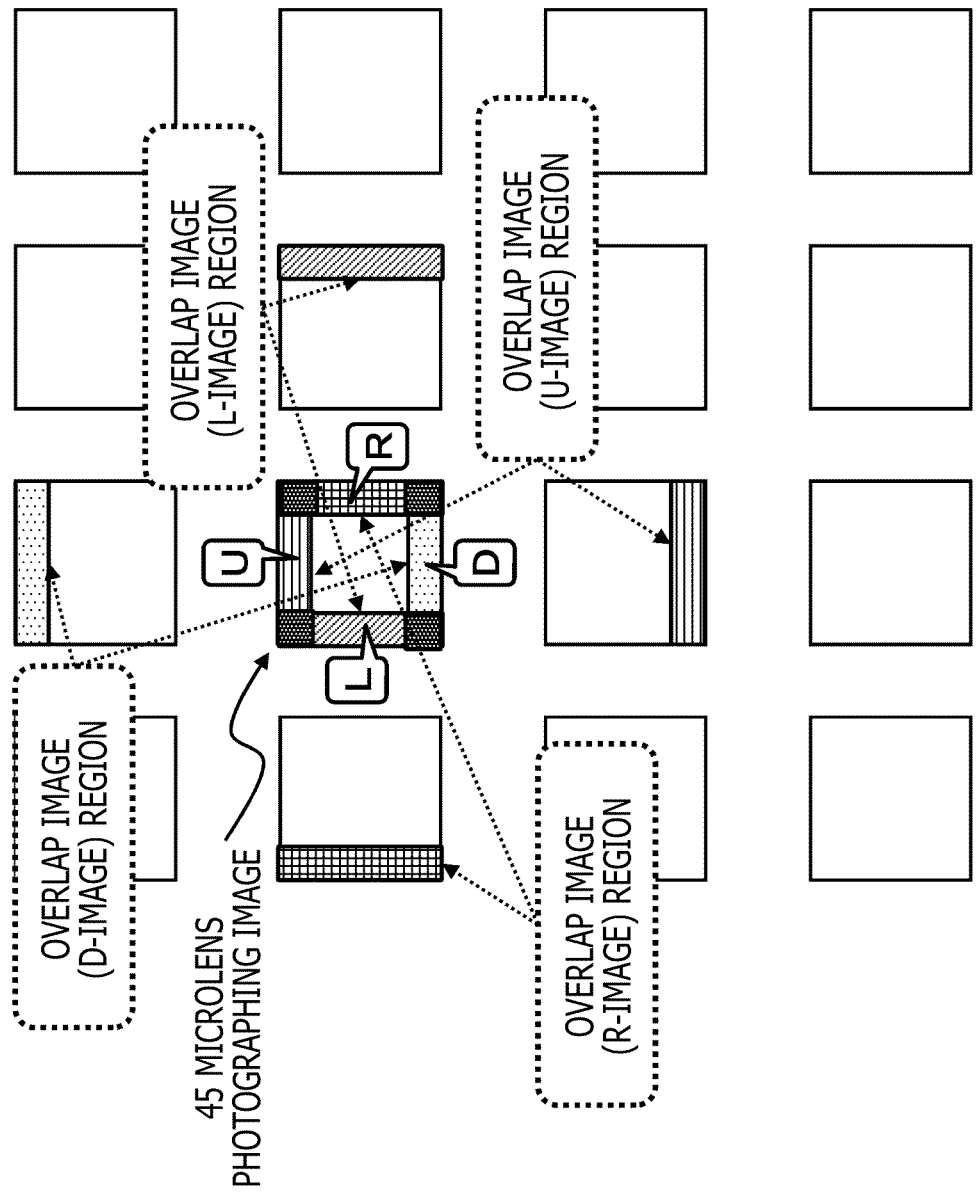
FIG. 4 is a diagram of assistance in explaining a photographing image of the imaging device having the microlens array (MLA).

The one microlens photographing image 45 illustrated in FIG. 4 has overlap image regions such that each of images of upper and lower and left and right side regions is also included in another microlens photographing image.

An upper edge region image (U-image) of the microlens photographing image 45 is an overlap image identical to a lower edge region image of another microlens photographing image adjacent to the microlens photographing image 45 illustrated in the figure in a downward direction.

A lower edge region image (D-image) of the microlens photographing image 45 is an overlap image identical to an upper edge region image of another microlens photographing image adjacent to the microlens photographing image 45 illustrated in the figure in an upward direction.

A left edge region image (L-image) of the microlens photographing image 45 is an overlap image identical to a right edge region image of another microlens photographing image adjacent to the microlens photographing image 45 illustrated in the figure in a right direction.

A right edge region image (R-image) of the microlens photographing image 45 is an overlap image identical to a left edge region image of another microlens photographing image adjacent to the microlens photographing image 45 illustrated in the figure in a left direction.

Overlap image regions are thus present in each of the microlens photographing images. Hence, the generation of a whole image needs processing such as performing an image cutout that detects overlap regions of each image and deletes the overlap images and combining the images after the cutout with one another. These pieces of processing impose a high load and cause problems such as the occurrence of a processing delay and an increase in processing cost.

[3. Movement Vector Calculation Processing in Image Processing Device According to Present Disclosure]

Movement vector calculation processing in an image processing device according to the present disclosure will next be described.

As described earlier with reference to FIG. 2, movement vector (optical flow) detection processing is performed to detect an identical subject position (corresponding pixel position) by detecting a manner of movement of a corresponding point (feature point) between two images photographed in two different timings, for example. After the corresponding pixel positions of plural images are calculated, one high quality image is generated by synthesis processing of the plural images.

An example of ordinary movement vector calculation processing will be described with reference to FIG. 5.

FIG. 5 is a diagram illustrating an example of movement vector (optical flow) calculation processing using a photographing image of an ordinary single lens camera rather than an imaging device using microlenses.

FIG. 5 illustrates two consecutive photographing image frames f1 and f2.

The image frame f1 is a photographing image at time t1. The image frame f2 is a photographing image at immediately succeeding time t2.

A feature point a, 51 and a feature point b, 52 determined that they are obtained by photographing an identical subject are photographed in the frame f1 and the frame f2.

As illustrated in the frame f2, a movement vector is a vector having a feature point position in the frame f1 as a starting point and having the identical feature point position in the frame f2 as an end point. That is, the movement vector (optical flow) is a vector indicating a moving direction and an amount of movement of a feature point from the time of photographing in the frame f1 to the time of photographing in the frame f2.

In the case where photographing images of an ordinary camera are used, whole images at respective photographing times can be obtained consecutively, and the calculation of the movement vector can be thus performed relatively easily.

However, there is a problem that an imaging device using microlenses increases the processing load of processing that generates whole images for use in movement vector calculation as described earlier with reference to FIGS. 2 to 4 and consequently increases the processing load of the movement vector calculation processing between the consecutive photographing images.

Movement vector calculation processing according to the present disclosure for solving this problem will be described in the following.

In processing according to the present disclosure, the movement vector calculation processing is performed by using a photographing image itself of the imaging device using the microlenses, that is, a large number of microlens photographing images, without generating one whole image from the photographing image of the imaging device using the microlenses.

A concrete example of processing performed by the image processing device according to the present disclosure will be described with reference to FIG. 6 and following figures.

Figure 6:
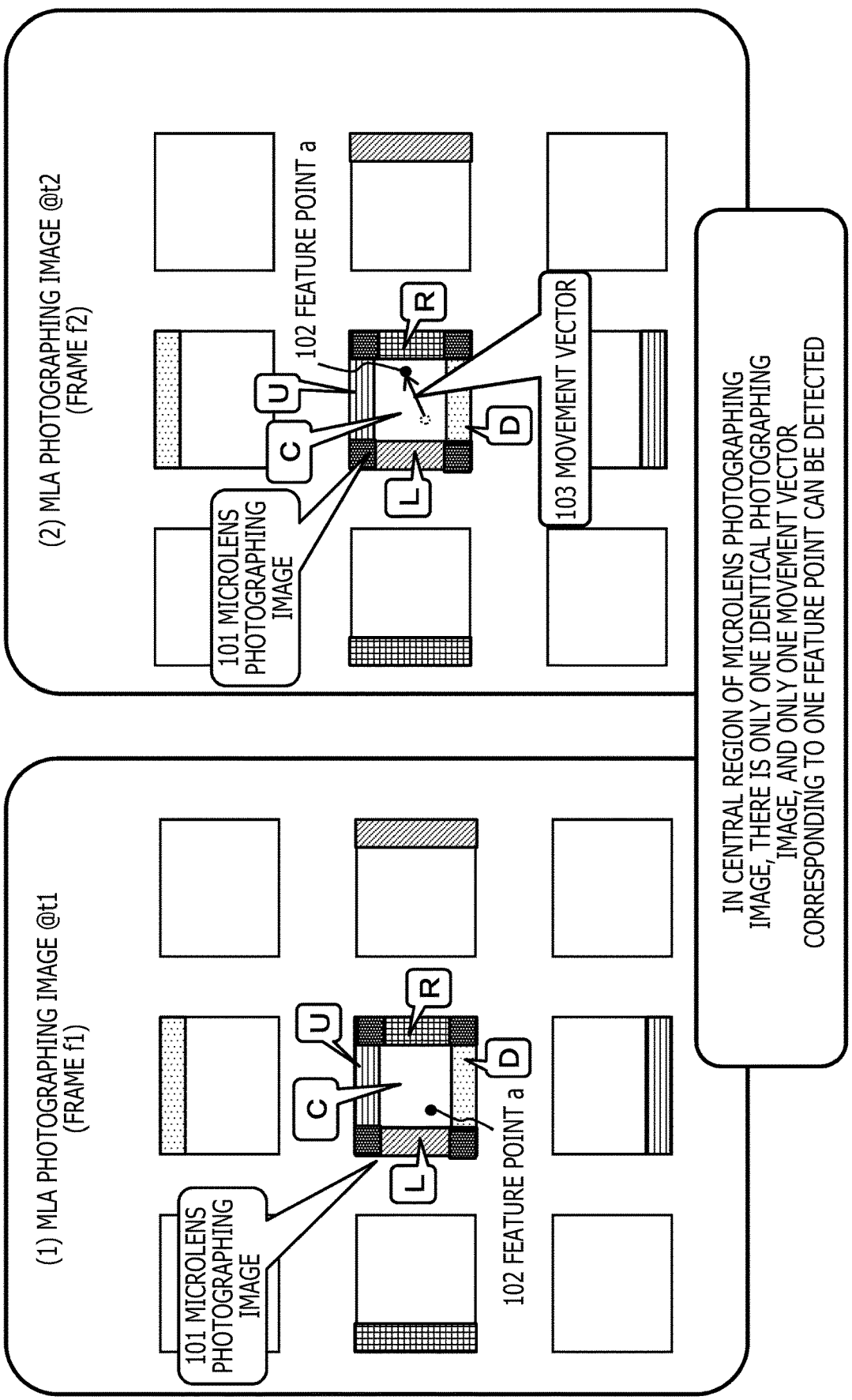
FIG. 6 is a diagram of assistance in explaining movement vector calculation processing based on photographing images of a microlens array (MLA) imaging device which processing is performed by an image processing device according to the present disclosure.

FIG. 6 illustrates a part of the following two consecutive photographing image frames of the microlens array (MLA) imaging device.

(1) a microlens array (MLA) photographing image @t1 (frame f1)

(2) a microlens array (MLA) photographing image @t2 (frame f2)

(1) the microlens array (MLA) photographing image @t1 (frame f1) is an image photographed at time t1, and (2) the microlens array (MLA) photographing image @t2 (frame f2) is an image photographed at immediately succeeding time t2.

Incidentally, the figure illustrates a part of each frame image, that is, 3×3=9 microlens photographing images. (1) and (2) are both images photographed by nine microlenses at identical positions.

At the time of calculation of a movement vector, a feature point is first extracted from the image in the frame f1. The example illustrated in FIG. 6 represents an example in which a feature point a, 102 is extracted from a central region image (C-image) of a central microlens photographing image 101 in the frame f1.

Incidentally, the central region image (C-image) of the microlens photographing image 101 is not an overlap image region. That is, this central region image (C-image) is a single image region not included in other peripheral microlens photographing images.

In this case, a feature point search is performed after a search range in the frame 2 for the feature point a, 102 detected from the frame f1 is set to the central region image (C-image) of the same microlens photographing image 101 as the microlens photographing image 101 in which the feature point a, 102 is detected.

That is, the feature point search is performed after the search range is set in which the position of the lens and the manner of inversion of the image are taken into consideration.

Suppose that this feature point search detects the feature point a, 102 in the central region image (C-image) of the microlens photographing image 101 in the frame f2 of FIG. 6(2).

Consequently, a movement vector 103 illustrated in the central region (C-image) of the microlens photographing image 101 in the frame f2 of FIG. 6(2) is calculated.

The image processing device according to the present disclosure sets a corresponding feature point detection range (search range) in the frame 2 according to the position of the feature point detected from the frame f1. In the example illustrated in FIG. 6, the feature point a, 102 detected from the frame f1 is in the central region (C-image) of the microlens photographing image 101 and is not in an overlap image region. Thus, the search range in the frame 2 is limited to the central region image (C-image) of the same microlens photographing image 101 as the microlens photographing image 101 in which the feature point a, 102 is detected.

The limitation of the search range makes high-speed processing possible.

Next, referring to FIG. 7, description will be made of processing in a case where a feature point is present in an overlap image region (duplicate image region).

Figure 7:
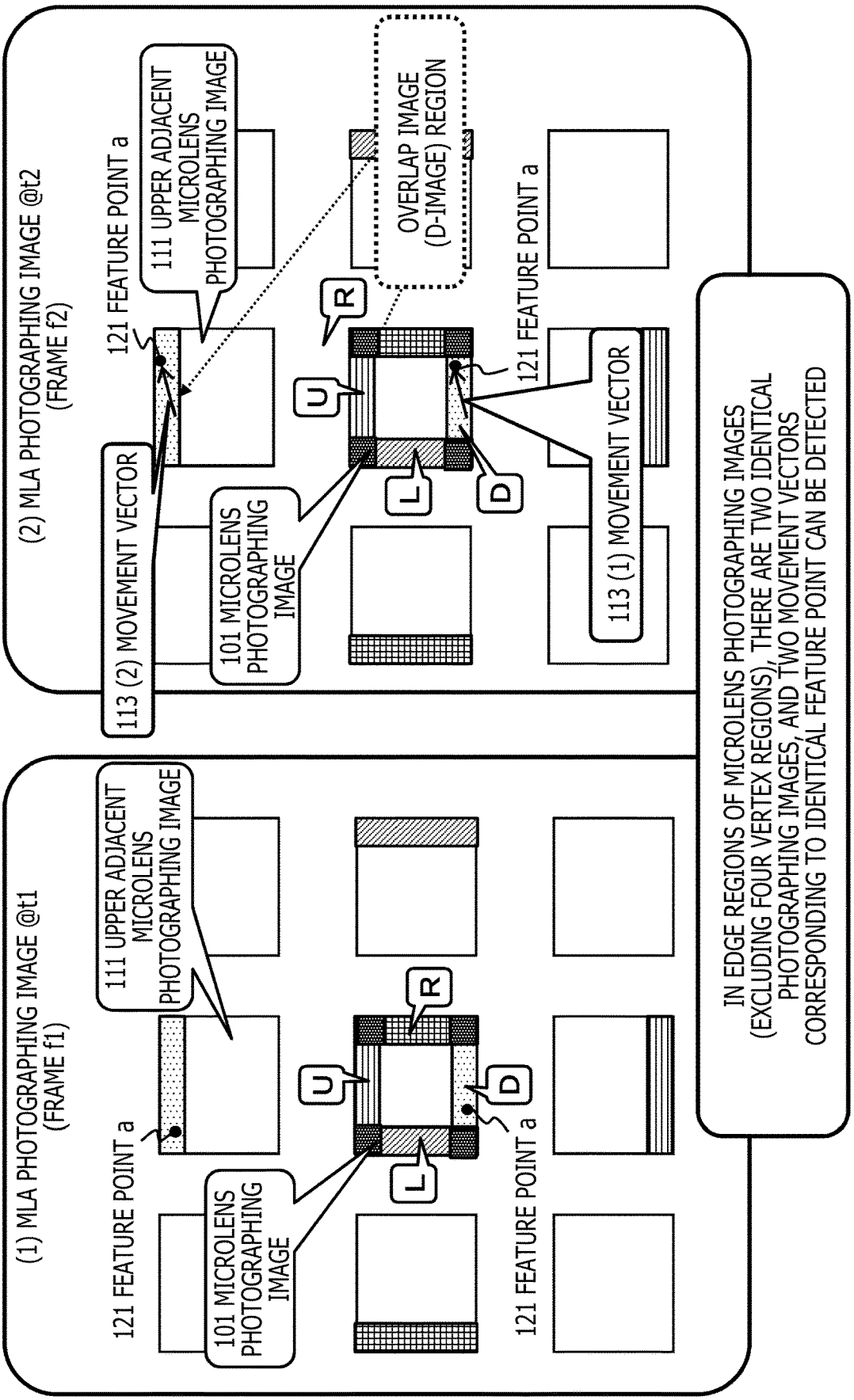
FIG. 7 is a diagram of assistance in explaining movement vector calculation processing based on photographing images of the microlens array (MLA) imaging device which processing is performed by the image processing device according to the present disclosure.

As with FIG. 6, FIG. 7 also illustrates a part of the following two consecutive photographing image frames of the microlens array (MLA) imaging device.

(1) a microlens array (MLA) photographing image @t1 (frame f1)

(2) a microlens array (MLA) photographing image @t2 (frame f2)

(1) the microlens array (MLA) photographing image @t1 (frame f1) is an image photographed at time t1, and (2) the microlens array (MLA) photographing image @t2 (frame f2) is an image photographed at immediately succeeding time t2. (1) and (2) are both images photographed by nine microlenses at identical positions.

At the time of calculation of a movement vector, a feature point is first extracted from the image in the frame f1. The example illustrated in FIG. 7 represents an example in which a feature point a, 121 is extracted from a lower region image (D-image) of a central microlens photographing image 101 in the frame f1.

Here, the lower region image (D-image) of the microlens photographing image 101 is an overlap image region. That is, this lower region image (D-image) is an overlap image region included also in an upper adjacent microlens photographing image 111 adjacent to the microlens photographing image 101 illustrated in the figure in an upward direction.

In this case, the same feature point a, 121 as the feature point a, 121 detected from the frame f1 can be detected from an upper region image (U-image) of the upper adjacent microlens photographing image 111.

In this case, a feature point search is performed after a search range in the frame 2 is set to not only the lower region image (D-image) of the same microlens photographing image 101 as the microlens photographing image 101 in which the feature point a, 121 is detected but also the upper region image (U-image) of the same upper adjacent microlens photographing image 111 as the upper adjacent microlens photographing image 111 as an overlap image region in which the same feature point a, 121 is detected.

That is, the feature point search is performed after the search range is set in which the positions of the lenses, the manner of inversion of the images, and the image duplicate regions are taken into consideration.

Suppose that this feature point search detects the feature point a, 121 from the lower region image (D-image) of the microlens photographing image 101 and the upper region image (U-image) of the upper adjacent microlens photographing image 111 in the frame f2 of FIG. 7(2).

Consequently, a movement vector 113(1) corresponding to the feature point a, 121 is set in the lower region image (D-image) of the microlens photographing image 101 in the frame f2 of FIG. 7(2), and a movement vector 113(2) corresponding to the same feature point a, 121 is also set in the upper region image (U-image) of the upper adjacent microlens photographing image 111.

These movement vectors correspond to one identical feature point a, 121 and therefore need to be ultimately set to be one movement vector. Processing of calculation of this one final movement vector will be described in a later paragraph.

The above description has been made of an example in which, in a case where the same image is included in different microlens photographing images and the same feature point is detected therein, two movement vectors corresponding to the one identical feature point can be detected from these two image regions.

In a case where the position of a feature point detected from the frame f1 is in an overlap image region, the image processing device according to the present disclosure sets the corresponding feature point detection range (search range) in the frame 2 to a plurality of overlap image regions identical to the detection region of the feature point detected from the frame f1. The limitation of the search range makes high-speed processing possible.

Incidentally, the example illustrated in FIG. 7 is an example in which one identical feature point a, 121 is detected from two different microlens photographing images. However, there are cases where one identical feature point is detected from four different microlens photographing images, depending on the detected position of the feature point.

That is, there are cases where the same image region is included in four different microlens photographing images. This example will be described with reference to FIG. 8.

Figure 8:
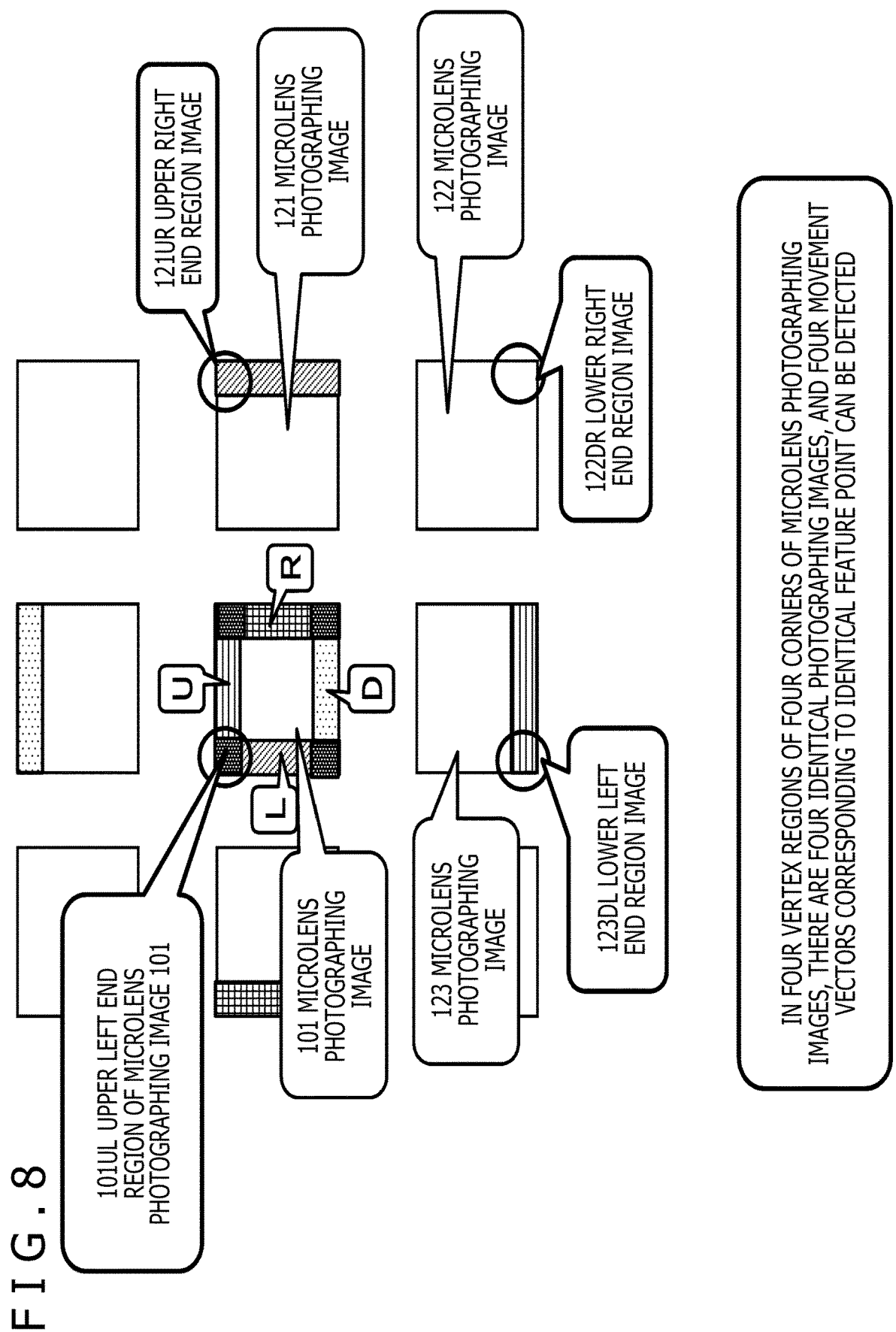
FIG. 8 is a diagram of assistance in explaining movement vector calculation processing based on photographing images of the microlens array (MLA) imaging device which processing is performed by the image processing device according to the present disclosure.

Nine microlens photographing images are also illustrated in FIG. 8.

Each of images of image regions at four vertices of a central microlens photographing image 101 is included in four different microlens photographing images.

Description will be made of an upper left end region image 101UL of the microlens photographing image 101 as one of the four vertex region images in FIG. 8.

As for the upper left end region image 101UL of the microlens photographing image 101, images identical to this region image are also included in three other microlens photographing images different from the microlens photographing image 101.

The identical images are included in regions indicated by circle marks in the figure, that is, the following three regions.

(1) an upper right end region image 121UR of a microlens photographing image 121 adjacent on the right of the microlens photographing image 101

(2) a right lower end region image 122DR of a microlens photographing image 122 adjacent on the lower right of the microlens photographing image 101

(3) a lower left end region image 123DL of a microlens photographing image 123 adjacent below the microlens photographing image 101

Thus, the upper left end region image 101UL of the microlens photographing image 101 is also present in the three other different microlens photographing images 121, 122, and 123. That is, the same image region is included in the four different microlens photographing images.

Incidentally, while description has been made of only one of the four vertices of the central microlens photographing image 101 in FIG. 8, the four vertex images are all similar and are image regions included in four different microlens photographing images.

In a case where the same image is thus included in four image regions and the image processing device according to the present disclosure detects a feature point in the regions, the image processing device according to the present disclosure performs processing of detecting four movement vectors corresponding to the same feature point, in all of the four image regions including the same image.

Incidentally, the search range of the feature point is limited to the four photographing image regions of four identical microlenses in each frame.

That is, a feature point search is performed after a search range is set in which the positions of the lenses, the manner of inversion of the images, and the image duplicate regions are taken into consideration.

Next, referring to FIG. 9 and following figures, description will be made of a concrete example of movement vector calculation processing.

The following three types of movement vector calculation processing will be described below in order.

(1) movement vector calculation processing corresponding to a feature point in a single image region (2) movement vector calculation processing corresponding to a feature point in two-image duplicate regions (3) movement vector calculation processing corresponding to a feature point in four-image duplicate regions First, (1) movement vector calculation processing corresponding to a feature point in a single image region will be described with reference to FIG. 9(1).

This movement vector calculation processing corresponds to the processing described earlier with reference to FIG. 6.

That is, this movement vector calculation processing is the processing of calculating a movement vector corresponding to a feature point detected from the central region image (C-image) of the microlens photographing image that is not an overlap image region. In the present example, only one movement vector corresponding to the same feature point can be detected.

The central region image (C-image) of the microlens photographing image is not an overlap image region. The central region image (C-image) is a single image region not included in other peripheral microlens photographing images.

In this case, a feature point search is performed after the central region image (C-image) of the same microlens photographing image in the frame f2 as the microlens photographing image in the frame f1 in which the feature point is detected is set as a search range. In a case where the feature point search detects the feature point from the frame f2, a vector is calculated which has a feature point position (x1, y1) in the frame f1 as a starting point and has a feature point position (x2, y2) in the frame f2 as an end point.

Consequently, as illustrated in FIG. 9(1), movement vector V=(Vx, Vy)=(x2−x1, y2−y1) can be calculated.

Next, (2) movement vector calculation processing corresponding to a feature point in two-image duplicate regions will be described with reference to FIG. 9(2).

This movement vector calculation processing corresponds to the processing described earlier with reference to FIG. 7.

That is, this movement vector calculation processing is the processing of calculating a movement vector in edge regions (excluding four vertex vicinity regions) of microlens photographing images as overlap image regions in which two identical images are present. In the present example, two movement vectors corresponding to the same feature point can be detected.

The edge regions (excluding four vertex vicinity regions) of the microlens photographing images are overlap image regions and are two-image duplicate regions such that the same image is included in another microlens photographing image.

In this case, a feature point search is performed after the same image regions (overlap image regions) of two microlens photographing images in the frame f2 as the image regions (overlap image regions) of two microlens photographing images in the frame f1 in which the same feature point is detected are set as a search range. This feature point search may detect two movement vectors corresponding to two identical feature points from the frame f2.

With regard to the two movement vectors, one final movement vector is calculated by processing illustrated in FIG. 9(2) (step S51).

That is, an average value V=(Vx, Vy) of the two movement vectors corresponding to the same feature point is calculated according to (Equation 1) in the following.

[Math. 1]

$$\overline{V_x} = \frac{1}{2}\sum_{i=1}^{2} v_{x_i} \quad \overline{V_y} = \frac{1}{2}\sum_{i=1}^{2} v_{y_i}$$ (Equation 1)

The average value V=(Vx, Vy) of the two movement vectors corresponding to the same feature point, the average value being calculated according to the above-described (Equation 1), is calculated as a movement vector.

Next, (3) movement vector calculation processing corresponding to a feature point in four-image duplicate regions will be described with reference to FIG. 10(3).

This movement vector calculation processing corresponds to processing in a case where the same image is included in four microlens photographing images, as described earlier with reference to FIG. 8.

That is, this movement vector calculation processing is the processing of calculating a movement vector in four vertex vicinity regions of microlens photographing images as overlap image regions in which four identical images are present. In the present example, four movement vectors corresponding to the same feature point can be detected.

The four vertex vicinity regions of the microlens photographing images are overlap image regions and are four-image duplicate regions such that the same image is included in the four microlens photographing images.

In this case, a feature point search is performed after the same image regions (overlap image regions) of four microlens photographing images in the frame f2 as the image regions (overlap image regions) of four microlens photographing images in the frame f1 in which the same feature point is detected are set as a search range. This feature point search may detect four movement vectors corresponding to four identical feature points from the frame f2.

With regard to the four movement vectors, one final movement vector is calculated by processing illustrated in FIG. 10(3) (steps S71 to S73).

First, in step S71, an average value V=(Vx, Vy) of the four movement vectors corresponding to the same feature point is calculated according to (Equation 2) in the following.

[Math. 2]

$$\overline{v_x} = \frac{1}{4}\sum_{i=1}^{4} v_{x_i} \quad \overline{v_y} = \frac{1}{4}\sum_{i=1}^{4} v_{y_i} \quad \text{(Equation 2)}$$

Next, in step S72, processing of excluding an outlier (abnormal value) from the four movement vectors is performed.

This processing is performed according to (Equation 3) in the following.
[Math. 3]
i satisfying ($\sqrt{\delta_{xi}^2+\delta_{yi}^2} > \delta_{th}$) at is set as an outlier
where $$(\delta_{xi}=v_{xi}-\overline{v_x}, \delta_{yi}=v_{yi}-\overline{v_y}(i=1,\ldots 4)) \quad \text{(Equation 3)}$$

Next, in step S73, the outlier (abnormal value) detected in step S72 is excluded, and an average value V=(Vx, Vy) of the remaining movement vectors is calculated again.

Consequently, the calculated average value V=(Vx, Vy) is set as a final movement vector corresponding to the feature point.

Thus, the image processing device according to the present disclosure performs the three types of movement vector calculation processing described with reference to FIGS. 9 to 10, that is, the following three kinds of processing.

(1) movement vector calculation processing corresponding to a feature point in a single image region (2) movement vector calculation processing corresponding to a feature point in two-image duplicate regions (3) movement vector calculation processing corresponding to a feature point in four-image duplicate regions In the following pieces of processing:

(2) movement vector calculation processing corresponding to a feature point in two-image duplicate regions, and (3) movement vector calculation processing corresponding to a feature point in four-image duplicate regions, among the above-described pieces of processing, one final movement vector corresponding to a feature point is calculated by using a plurality of movement vectors corresponding to the same feature point, and thus, more accurate movement vector calculation can be performed by performing the processing not dependent on one data but based on plural pieces of data.

Incidentally, which of the above-described pieces of processing (1) to (3) to perform is determined according to the position of the feature point detected by a data processing section of the image processing device.

In a case where the feature point is detected from the central region image (C-image) of a microlens photographing image, (1) movement vector calculation processing corresponding to a feature point in a single image region is performed.

In addition, in a case where the feature point is detected from edge regions (excluding four vertex vicinity regions) of microlens photographing images as overlap image regions in which two identical images are present, (2) movement vector calculation processing corresponding to a feature point in two-image duplicate regions is performed.

Further, in a case where the feature point is detected from four vertex vicinity regions of microlens photographing images as overlap image regions in which four identical images are present, (3) movement vector calculation processing corresponding to a feature point in four-image duplicate regions is performed.

Exceptionally, however, different processing is performed as processing for feature points detected from microlens photographing images corresponding to microlenses present at outermost circumferential positions of the microlens array.

This exception processing will be described with reference to FIG. 11 and following figures.

The left side of FIG. 11 illustrates the microlens array (MLA) 10. Microlenses present at outermost circumferential positions of the microlens array (MLA) 10 are illustrated in white.

Consideration will be given to a photographing image of one microlens a150 among the microlenses, for example.

The right side of FIG. 11 illustrates a microlens "a" photographing image 151 as a photographing image of the microlens a150 present at an outermost circumferential position of the microlens array (MLA) 10.

An upper region image (U-image) of the microlens "a" photographing image 151 is an overlap image identical to a lower edge region image of another microlens photographing image adjacent to the microlens "a" photographing image 151 illustrated in the figure in the downward direction.

In addition, a lower edge region image (D-image) of the microlens "a" photographing image 151 is an overlap image identical to an upper edge region image of another microlens photographing image adjacent to the microlens "a" photographing image 151 illustrated in the figure in the upward direction.

A left edge region image (L-image) of the microlens "a" photographing image 151 is an overlap image identical to a right edge region image of another microlens photographing image adjacent to the microlens "a" photographing image 151 illustrated in the figure in the right direction.

However, because no microlens photographing image is present on the left side of the microlens "a" photographing image 151, a right edge region image (R-image) of the microlens "a" photographing image 151 is a single image whose identical image is not present in other microlens photographing images.

In this case, in a case where the image processing device according to the present disclosure detects a feature point from the right edge region image (R-image) of the microlens "a" photographing image 151, as in a case where the image processing device detects a feature point from the central region image (C-image) of a microlens photographing image, the image processing device performs the processing illustrated in FIG. 9(1), that is, (1) movement vector calculation processing corresponding to a feature point in a single image region.

FIG. 12 is a diagram illustrating the microlens "a" photographing image 151 as a photographing image of the microlens a150 present at an outermost circumferential position of the microlens array (MLA) 10 as in FIG. 11.

A diagram on the right side of FIG. 12 is a diagram of assistance in explaining an overlap mode of an upper right region image (UR-image) 151UR of the microlens "a" photographing image 151. In a case where the microlens photographing image is not at an outermost circumferential position of the microlens array (MLA) 10, four duplicate images are present as four vertex vicinity images as described earlier with reference to FIG. 8, and (3) movement vector calculation processing corresponding to a feature point in four-image duplicate regions is performed, which has been described with reference to FIG. 10(3).

However, as illustrated in FIG. 12, because no microlens photographing image is present on the left side of the microlens "a" photographing image 151, an overlap image of the upper right region image (UR-image) 151UR of the microlens "a" photographing image 151 is present only in a microlens photographing image 152 adjacent on the lower side of the microlens "a" photographing image 151.

That is, there are only two duplicate images.

Hence, in a case where the image processing device according to the present disclosure detects a feature point from a vertex vicinity region image of the microlens "a" photographing image 151 present at an outermost circumferential position of the microlens array (MLA) 10, as in a case where the image processing device detects a feature point from overlap image regions in which two identical images are present, the image processing device performs (2) movement vector calculation processing corresponding to a feature point in two-image duplicate regions, which is illustrated in FIG. 9(2).

Figure 13:
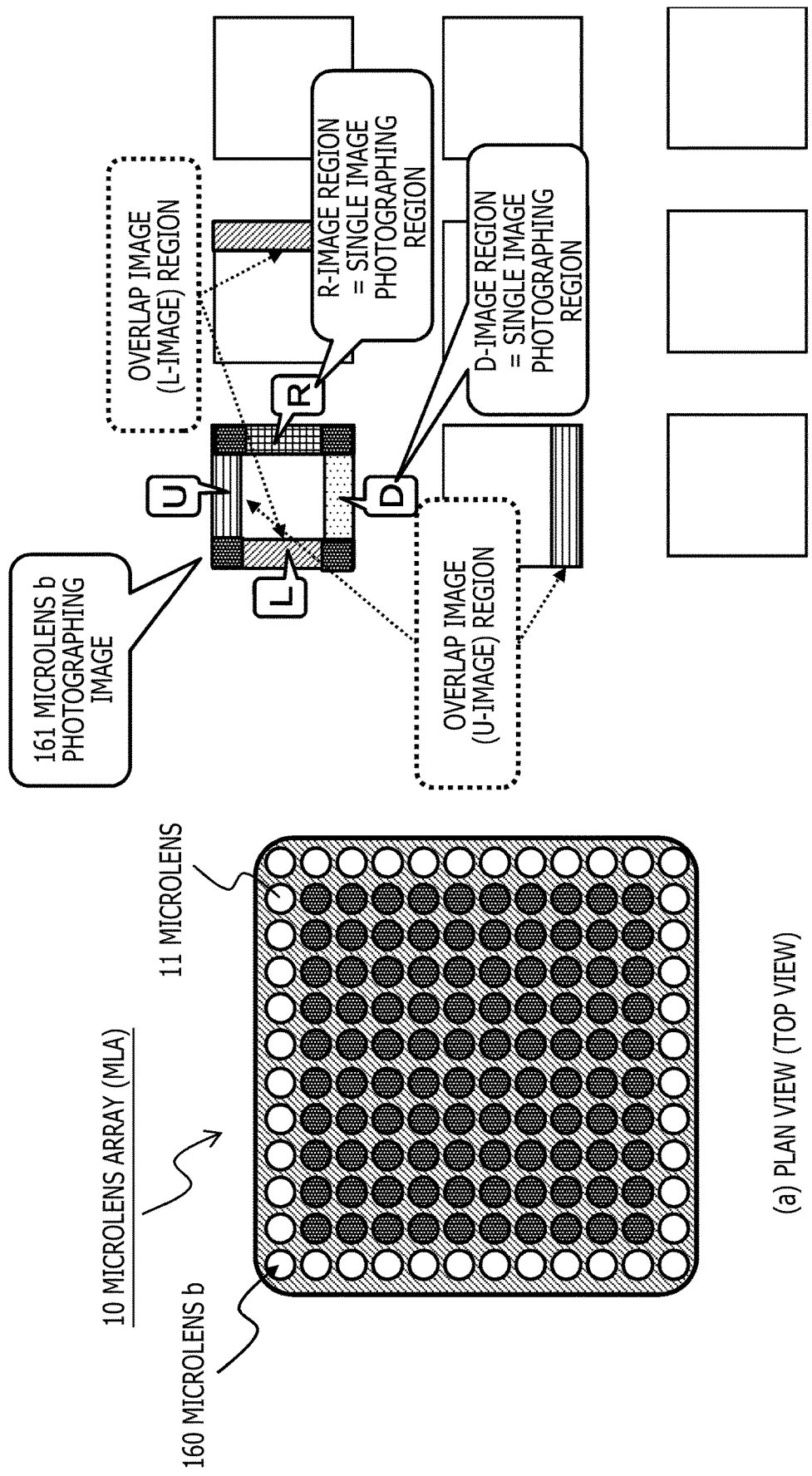
FIG. 13 is a diagram of assistance in explaining movement vector calculation processing based on photographing images of the microlens array (MLA) imaging device which processing is performed by the image processing device according to the present disclosure.

FIG. 13 is a diagram of assistance in explaining processing for a photographing image of one microlens b160 at a vertex position of the microlens array (MLA) 10. The right side of FIG. 13 illustrates a microlens "b" photographing image 161 as a photographing image of the microlens b160 present at an outermost circumferential position and a vertex position of the microlens array (MLA) 10.

An upper region image (U-image) of the microlens "b" photographing image 161 is an overlap image identical to a lower edge region image of another microlens photographing image adjacent to the microlens "b" photographing image 161 illustrated in the figure in the downward direction.

In addition, a left edge region image (L-image) of the microlens "b" photographing image 161 is an overlap image identical to a right edge region image of another microlens photographing image adjacent to the microlens "b" photographing image 161 illustrated in the figure in the right direction.

However, because no microlens photographing image is present on the upper side and the left side of the microlens "b" photographing image 161, a lower edge region image (D-image) and a right edge region image (R-image) of the microlens "b" photographing image 161 are each a single image whose identical image is not present in other microlens photographing images.

In this case, in a case where the image processing device according to the present disclosure detects a feature point from the lower edge region image (D-image) or the right edge region image (R-image) of the microlens "b" photographing image 161, as in a case where the image processing device detects a feature point from the central region image (C-image) of a microlens photographing image, the image processing device performs the processing illustrated in FIG. 9(1), that is, (1) movement vector calculation processing corresponding to a feature point in a single image region.

Figure 14:
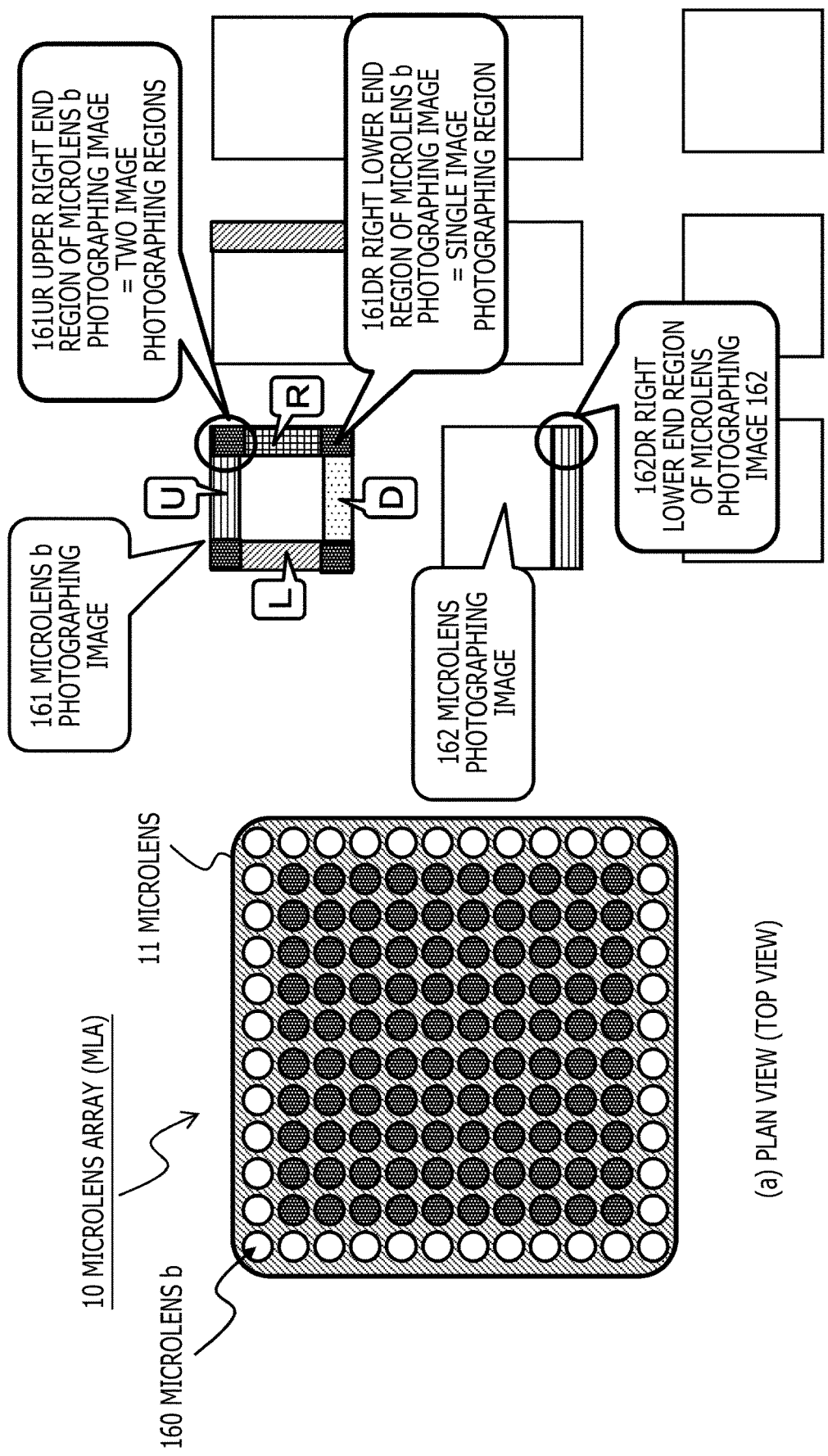
FIG. 14 is a diagram of assistance in explaining movement vector calculation processing based on photographing images of the microlens array (MLA) imaging device which processing is performed by the image processing device according to the present disclosure.

FIG. 14 is a diagram illustrating the microlens "b" photographing image 161 as a photographing image of the microlens b160 present at an outermost circumferential position and a vertex position of the microlens array (MLA) 10 as in FIG. 13.

A diagram on the right side of FIG. 14 is a diagram of assistance in explaining an overlap mode of an upper right region image (UR-image) 161UR of the microlens "b" photographing image 161. In a case where the microlens photographing image is not at an outermost circumferential position of the microlens array (MLA) 10, four duplicate images are present as four vertex vicinity images as described earlier with reference to FIG. 8, and (3) movement vector calculation processing corresponding to a feature point in four-image duplicate regions is performed, which has been described with reference to FIG. 10(3).

However, as illustrated in FIG. 14, because no microlens photographing image is present on the upper side and the left side of the microlens "b" photographing image 161, an overlap image of the upper right region image (UR-image) 161UR of the microlens "b" photographing image 161 is present only in a microlens photographing image 162 adjacent on the lower side of the microlens "b" photographing image 161.

That is, there are only two duplicate images.

Hence, in a case where the image processing device according to the present disclosure detects a feature point from the upper right region image (UR-image) 161UR of the microlens "b" photographing image 161 present at an outermost circumferential vertex position of the microlens array (MLA) 10, as in a case where the image processing device detects a feature point from overlap image regions in which two identical images are present, the image processing device performs (2) movement vector calculation processing corresponding to a feature point in two-image duplicate regions, which is illustrated in FIG. 9(2).

In addition, because no adjacent microlens photographing image is present on the upper side nor the left side of the microlens "b" photographing image 161, an overlap image of a right lower region image (DR-image) 161DR of the microlens "b" photographing image 161 is a single image region whose duplicate images are not present.

In this case, in a case where the image processing device according to the present disclosure detects a feature point from the right lower region image (DR-image) 161DR of the microlens "b" photographing image 161, as in a case where the image processing device detects a feature point from the central region image (C-image) of a microlens photographing image, the image processing device performs the processing illustrated in FIG. 9(1), that is, (1) movement vector calculation processing corresponding to a feature point in a single image region.

Thus, the image processing device according to the present disclosure determines how many image regions identical to an image region at a position at which a feature point is detected are included in microlens photographing images, selects which of the pieces of processing described with reference to FIG. 9 and FIG. 10, that is, (1) movement vector calculation processing corresponding to a feature point in a single image region, (2) movement vector calculation processing corresponding to a feature point in two-image duplicate regions, and (3) movement vector calculation processing corresponding to a feature point in four-image duplicate regions to perform according to the number of identical image regions, and performs the selected processing.

[4. Fingerprint Authentication Processing to which Image Processing Device according to Present Disclosure is Applied]

Next, description will be made of the present fingerprint authentication processing to which the above-described movement vector (optical flow) processing according to the present disclosure is applied.

Incidentally, there are biometric authenticating devices that perform, for example, vein authentication, fingerprint authentication, iris authentication, and the like as biometric authenticating devices using a microlens array imaging device. Here, as a representative example thereof, a fingerprint authenticating device using a microlens array imaging device will be described in the following. The configuration according to the present disclosure is not limited to the fingerprint authenticating device but applicable also to other biometric authenticating devices for vein authentication, iris authentication, and the like.

FIG. 15 is a diagram of assistance in explaining a sequence of the fingerprint authentication processing by the image processing device according to the present disclosure. The sequence of the fingerprint authentication processing is, for example, performed according to the processing of steps S101 to S103 illustrated in FIG. 15.

Incidentally, the conventional fingerprint authentication processing sequence using the microlens array imaging device has been described earlier with reference to FIG. 2. The sequence illustrated in FIG. 15 is a sequence that makes it possible to perform the fingerprint authentication processing using the same microlens array imaging device efficiently without causing a high processing load.

The processing of steps S101 to S103 illustrated in FIG. 15 will be described in order. Incidentally, these pieces of processing can be performed according to a program stored in a storage section of the image processing device, under control of a control section (data processing section) including a CPU having a program executing function or the like.

(Step S101)

First, a moving image of a finger of a user is photographed in step S101.

FIG. 15 illustrates a microlens array (MLA) photographing image @t1, 201 photographed at time (t1) and a microlens array (MLA) photographing image @t2, 202 photographed at time (t2). Incidentally, while an example of processing using two consecutive photographing images will be described in the following, three or more consecutive photographing images may also be used.

Each of quadrangles illustrated within the microlens array (MLA) photographing images 201 and 202 illustrated in step S101 in FIG. 15 is one microlens photographing image 203.

As described earlier, in the microlens array (MLA) imaging device, an image photographed by the imaging element is represented by a large number of images corresponding to the respective microlenses included in the array.

(Step S102)

Next step S102 performs processing of detecting a movement vector (optical flow) from the two microlens array (MLA) photographing images 201 and 202 as two consecutive photographing images.

This movement vector (optical flow) detection processing is the movement vector detection processing according to the present disclosure, which has been described earlier with reference to FIGS. 6 to 13. That is, the movement vector (optical flow) detection processing is performed by using the photographing images themselves including a large number of microlens photographing images, without generating the whole images as in step S12 described earlier with reference to FIG. 2.

The image processing device according to the present disclosure detects a feature point as a movement vector calculation target from the photographing images including a large number of microlens photographing images, and performs the setting of a different search range and movement vector calculation processing according to the position of the detected feature point.

Specifically, in a case where a feature point is detected from the central region image (C-image) of one microlens photographing image, a corresponding feature point is searched after a central region image (C-image) at the same position in a microlens photographing image photographed in different timing is set as a search range. Further, (1) movement vector calculation processing corresponding to a feature point in a single image region is performed, which has been described earlier with reference to FIG. 9(1).

In addition, in a case where a feature point is detected from edge regions (excluding four vertex vicinity regions) of microlens photographing images as overlap image regions in which two identical images are present, the same feature point is first detected from the overlap image regions in the same frame.

Next, a corresponding feature point is searched after two identical image regions of microlens photographing images photographed in different timing are set as a search range. Further, (2) movement vector calculation processing corresponding to a feature point in two-image duplicate regions is performed, which has been described earlier with reference to FIG. 9(2).

Further, in a case where a feature point is detected from four vertex vicinity regions of microlens photographing images as overlap image regions in which four identical images are present, the same feature point is first detected from the overlap image regions in the same frame.

Next, a corresponding feature point is searched after four identical image regions of microlens photographing images photographed in different timing are set as a search range. Further, (3) movement vector calculation processing corresponding to a feature point in four-image duplicate regions is performed, which has been described earlier with reference to FIG. 10(3).

By performing these pieces of processing, it is possible to detect a movement vector (optical flow) without generating whole images as in step S12 described earlier with reference to FIG. 2.

(Step S103)

Next, by using the movement vector detected in step S102, step S103 performs alignment of each image and high quality image generation processing. Incidentally, this image alignment processing and the high quality image generation processing can be performed in microlens photographing image units.

The image alignment processing and the high quality image generation processing are performed in microlens photographing image units, and thereafter, one whole image of a high quality is generated by combining microlens photographing images improved in image quality with each other.

Here, it is necessary to perform the vertical and horizontal inversion processing of the individual microlens photographing images, an image cutout that detects and deletes overlap regions, and image combination processing after the cutout. However, this processing is performed only once in the processing according to the present disclosure.

In the processing described earlier with reference to FIG. 2, the processing of generating a whole image for each individual photographing image is necessary in step S12. On an assumption that the processing using a minimum of two or more consecutive photographing images is performed, the number of man-hours of the whole image generation processing in the processing according to the present disclosure is equal to or less than ½ that of the conventional processing illustrated in FIG. 2.

A high quality image 210 having clear fingerprint information of the finger and the like is generated as a result of the processing of step S103.

Though not illustrated in the figure, processing of verifying the high quality image 210 against fingerprint data registered in a memory in advance is finally performed.

Incidentally, in the processing according to the present disclosure, in a case where a feature point is detected from duplicate image regions at the time of the movement vector (optical flow) calculation processing in step S102, one final movement vector corresponding to the feature point is calculated by using a plurality of movement vectors corresponding to the same feature point. That is, a configuration that performs processing not dependent on one piece of data but based on a plurality of pieces of data is provided, so that more accurate movement vector calculation can be performed.

FIG. 16 and FIG. 17 are diagrams of assistance in explaining a concrete example of fingerprint authentication processing to which the image processing device according to the present disclosure is applied. FIGS. 16 to 17 illustrate concrete examples of the respective pieces of processing of processing steps S101 to S104 of the fingerprint authentication processing. The processing of steps S101 to S103 is processing corresponding to the processing steps S101 to S103 described with reference to FIG. 15.

The processing of each step illustrated in FIGS. 16 to 17 will be described.

(Step S101)

Step S101 is a step of photographing a moving image of a finger of a user. As illustrated in FIG. 17, the user slides the finger on the screen of a smartphone. A microlens array (MLA) imaging device is mounted on the screen of the smartphone.

As illustrated in FIG. 16, three consecutive photographing images in frames f1 to f3 are photographed in conjunction with movement of the finger.

(Step S102)

Next step S102 is movement vector (optical flow) detection processing using the three images photographed in step S101.

Step S102 in FIG. 16 illustrates an example of the following movement vector detection results:

a movement vector detection processing result between the frame f1 and the frame f2, and a movement vector detection processing result between the frame f2 and the frame f3.

A synthetic image of a high quality can be generated by thus detecting movement vectors between two or more consecutive photographing images, setting the frame f2, for example, as a reference image, and synthesizing the images with the position of the images in the frame f1 and the frame f3 adjusted to the position of the reference image (frame f2).

The movement vector (optical flow) detection processing illustrated in step S102 in FIG. 16 is performed as processing that uses a large number of microlens photographing images as they are.

A result of performing the movement vector detection processing according to the present disclosure, which has been described with reference to FIGS. 6 to 13, is obtained. According to the position of a feature point detected from a microlens photographing image, any one of the three types of movement vector calculation processing described earlier with reference to FIG. 9 and FIG. 10, that is, the following three kinds of processing, is performed.

(1) movement vector calculation processing corresponding to a feature point in a single image region (2) movement vector calculation processing corresponding to a feature point in two-image duplicate regions (3) movement vector calculation processing corresponding to a feature point in four-image duplicate regions By performing this processing, it is possible to detect a movement vector (optical flow) without generating whole images as in step S12 described earlier with reference to FIG. 2.

(Step S103)

The processing of next step S103 is processing of aligning each image by using the movement vector detected in step S102, and generating a high quality image.

In the example illustrated in FIG. 16, a high quality image is generated by using the three images in the frames f1 to f3. For example, the image position of the frame f1 is adjusted to the position of the frame f2 as a reference image. This alignment processing can be performed by using the movement vector between the frame f1 and the frame f2 which movement vector is detected in step S102.

Further, the image position of the frame f3 is adjusted to the position of the frame f2 as a reference image. This alignment processing can be performed by using the movement vector between the frame f2 and the frame f3 which movement vector is detected in step S102.

Image quality improvement processing is thereafter performed by processing such as alpha blending of corresponding pixels in these three different photographing timings. One whole image of a high quality is thereafter generated by combining the microlens photographing images improved in image quality with one another. Here, it is necessary to perform the vertical and horizontal inversion processing of the individual microlens photographing images, an image cutout that detects and deletes overlap regions, and image combination processing after the cutout. However, this processing is only one piece of whole image generation processing in the processing according to the present disclosure.

A high quality image having clear fingerprint information of the finger and the like is generated as a result of the processing of step S103.

(Step S104)

Finally, the fingerprint authentication processing is performed in step S104 illustrated in FIG. 17. This fingerprint authentication processing is processing of verifying the high quality image generated in step S103 against fingerprint data registered in a memory 230 in advance.

The high quality image generated in step S103 is (a) a high quality image illustrated in FIG. 17. This high quality image is the image generated on the basis of each consecutive photographing image in step S103.

A clear fingerprint (feature point) 221 is photographed in this high quality image. Highly accurate determination processing for identity can be performed by verifying the high quality image against (b) a registered image registered in the memory 230 in advance.

The processing according to the present disclosure thus performs the movement vector detection processing in microlens photographing image units, and can thereby omit the whole image generation processing step (step S12 in FIG. 2) in consecutive photographing image units, so that efficient processing is realized.

In addition, more accurate movement vector calculation can be performed by calculating one final movement vector from a plurality of movement vectors corresponding to an identical feature point detected from duplicate image regions, as described with reference to FIG. 9 and FIG. 10.

[5. Examples of Configuration and Processing Sequences of Image Processing Devices According to Present Disclosure]

Next, referring to FIG. 18 and following figures, description will be made of examples of configuration and processing sequences of image processing devices according to the present disclosure. Incidentally, in the following, the following three image processing devices will be described in order as image processing devices using the movement vector calculation processing according to the present disclosure.

(First Embodiment) an image processing device that performs fingerprint authentication and registration processing (Second Embodiment) an image processing device that detects an operation (a flick, a swipe, or the like) of a finger on a display screen (Third Embodiment) an image processing device that performs moving image compression processing (First Embodiment) an Image Processing Device that Performs Fingerprint Authentication and Registration Processing First, an example of configuration and a processing sequence of an image processing device that performs fingerprint authentication processing and fingerprint registration processing will be described as a first embodiment.

Figure 18:
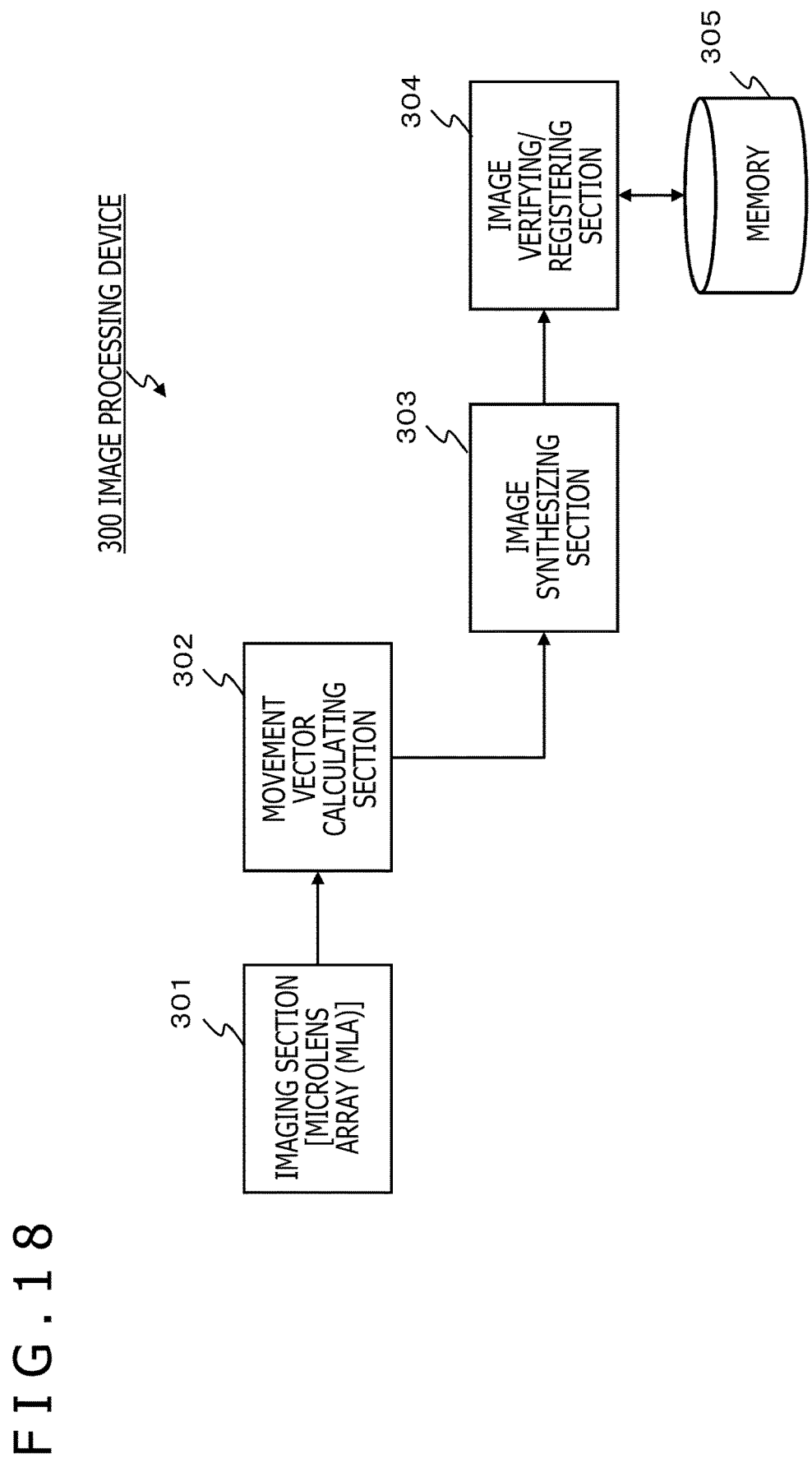
FIG. 18 is a diagram of assistance in explaining an example of a configuration of an image processing device according to the present disclosure.

FIG. 18 is a diagram illustrating an example of configuration of an image processing device 300 according to the present first embodiment.

As illustrated in FIG. 18, the image processing device 300 includes an imaging section 301, a movement vector calculating section 302, an image synthesizing section 303, an image verifying/registering section 304, and a memory 305. Incidentally, the block diagram illustrated in FIG. 18 is a block diagram illustrating only main constituent elements necessary for the processing according to the present disclosure. The image processing device 300 is not limited to the constituent elements illustrated in FIG. 18 but includes, for example, constituent elements such as a control section, a storage section, an input section, and an output section.

Incidentally, the imaging section 301 may be of a configuration separate from the image processing device. In this case, the image processing device 300 is supplied with a captured image of the imaging section 301 via the input section not illustrated and performs processing.

Each constituent section will be described.

The imaging section 301 is an imaging section having a microlens array (MLA) described earlier with reference to FIG. 1. A photographing image is photographed via a plurality of microlenses. For example, a moving image of a finger of a user when the finger is slid on the screen of the smartphone is photographed. Images of respective frames included in the moving image each include a large number of microlens photographing images. Each of the microlens photographing images is an image inverted vertically and horizontally and is an image partly including regions duplicated in other microlens photographing images.

The moving image as the photographing images of the imaging section 301 is input to the movement vector calculating section 302.

The movement vector calculating section 302 performs processing of calculating a movement vector (optical flow) in each frame image of the moving image as the photographing images of the imaging section 301.

The movement vector calculating section 302 performs the movement vector (optical flow) calculation processing using a large number of microlens photographing images as they are.

The movement vector calculating section 302 detects a feature point from a microlens photographing image, and according to the position of the detected feature point, the movement vector calculating section 302 performs any one of the three types of movement vector calculation processing described earlier with reference to FIG. 9 and FIG. 10, that is, the following three kinds of processing.

(1) movement vector calculation processing corresponding to a feature point in a single image region (2) movement vector calculation processing corresponding to a feature point in two-image duplicate regions (3) movement vector calculation processing corresponding to a feature point in four-image duplicate regions The movement vector (optical flow) detected by the movement vector calculating section 302 is output to the image synthesizing section 303.

The image synthesizing section 303 aligns consecutive photographing images included in the moving image photographed by the imaging section 301, by using the movement vector (optical flow) detected by the movement vector calculating section 302, and generates a high quality image. The high quality image having clear fingerprint information of the finger and the like is generated as a result of this processing.

Specifically, for example, image quality improvement processing is performed by processing such as alpha blending of corresponding pixels in different photographing timings. One whole image of a high quality is thereafter generated by combining the microlens photographing images improved in image quality with one another. Here, it is necessary to perform vertical and horizontal inversion processing of the individual microlens photographing images, an image cutout that detects and deletes overlap regions, and image combination processing after the cutout. However, this processing is only one piece of whole image generation processing in the processing according to the present disclosure.

The high quality image generated by the image synthesizing section 303 is output to the image verifying/registering section 304.

The image verifying/registering section 304 is supplied with the high quality image of the finger from the image synthesizing section 303 and performs image verification processing or registration processing.

At the time of performing the fingerprint authentication processing, the processing of verifying the high quality image of the finger which high quality image is input from the image synthesizing section 303 against a registered image already stored in a memory 315 is performed. In a case where the verification is established, the processing proceeds to next processing. In a case of a verification error, a message indicating an authentication error is output.

At the time of fingerprint registration processing, on the other hand, the high quality image of the finger which high quality image is input from the image synthesizing section 303 is stored as registered information in the memory 315.

A processing sequence of the image processing device 300 illustrated in FIG. 18 will be described with reference to a flowchart illustrated in FIG. 19.

Figure 19:
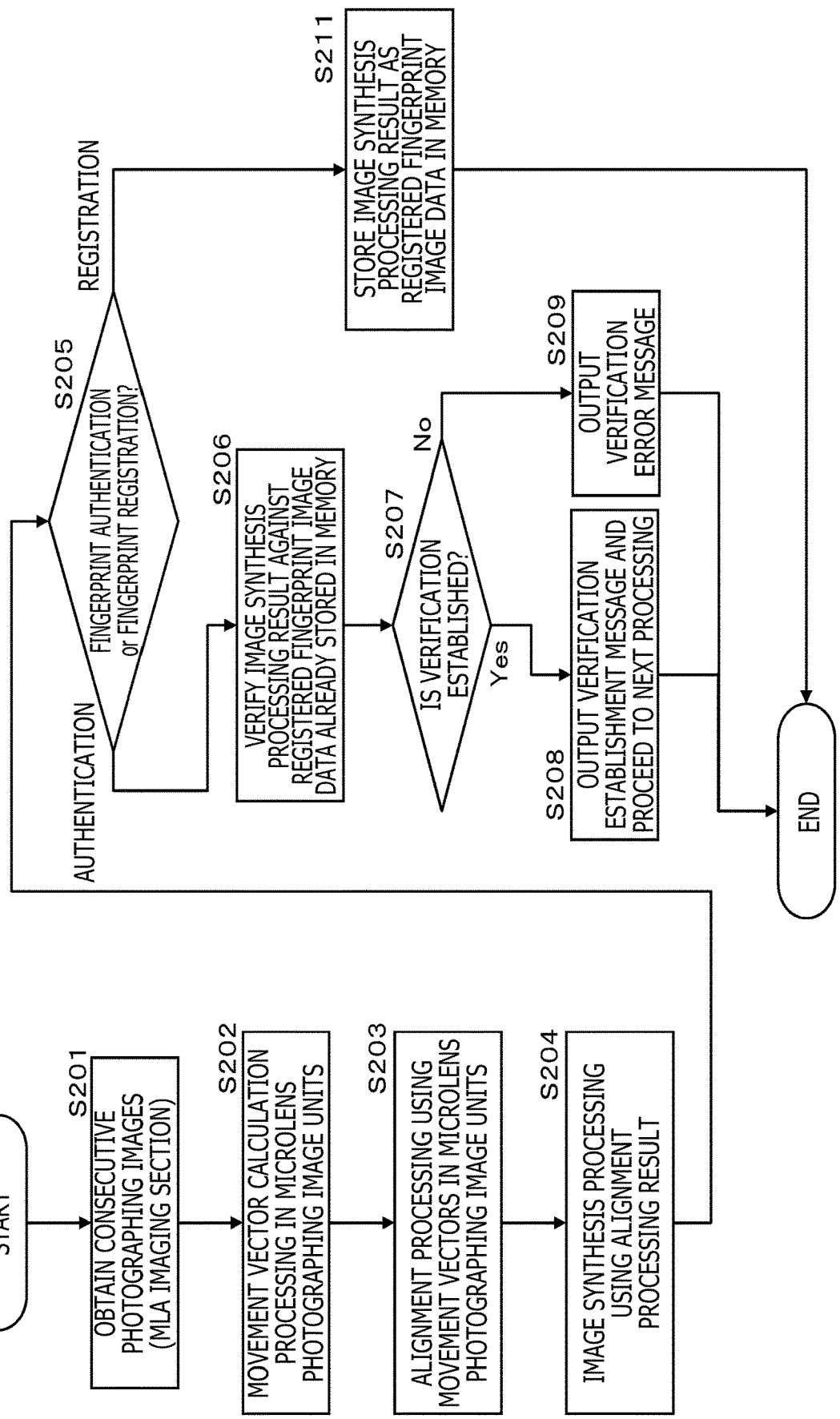
FIG. 19 is a diagram illustrating a flowchart of assistance in explaining a sequence of processing performed by the image processing device according to the present disclosure.

Incidentally, processing according to the flowchart illustrated in FIG. 19 is, for example, processing executable according to a program stored in the storage section of the image processing device, and can be performed under control of a control section (data processing section) including a CPU having a program executing function or the like.

The processing of each step of the flow illustrated in FIG. 19 will be described in order in the following.
(Step S201)

First, in step S201, consecutive photographing images, that is, a moving image, is photographed.

This processing is performed by the imaging section 301 of the image processing device 300 illustrated in FIG. 18. The imaging section 301 photographs the photographing images via a plurality of microlenses. For example, a moving image of a finger of a user when the finger is slid on the screen of the smartphone is photographed.

The moving image as the photographing images of the imaging section 301 is input to the movement vector calculating section 302.
(Step S202)

Next, in step S202, the movement vector calculation processing in microlens photographing image units is performed. This processing is performed by the movement vector calculating section 302. The movement vector calculating section 302 performs processing of calculating a movement vector (optical flow) in each frame image of the moving image as the photographing images of the imaging section 301. The movement vector calculating section 302 performs the movement vector (optical flow) calculation processing using a large number of microlens photographing images as they are.

The movement vector calculating section 302 detects a feature point from a microlens photographing image, and according to the position of the detected feature point, the movement vector calculating section 302 performs any one of the three types of movement vector calculation processing described earlier with reference to FIG. 9 and FIG. 10, that is, the following three kinds of processing.

(1) movement vector calculation processing corresponding to a feature point in a single image region
(2) movement vector calculation processing corresponding to a feature point in two-image duplicate regions
(3) movement vector calculation processing corresponding to a feature point in four-image duplicate regions The movement vector (optical flow) detected by the movement vector calculating section 302 is output to the image synthesizing section 303.

(Step S203)

Next, in step S203, alignment processing using movement vectors in microlens photographing image units is performed. This processing is performed by the image synthesizing section 303.

The image synthesizing section 303 aligns consecutive photographing images included in the moving image photographed by the imaging section 301, by using the movement vector (optical flow) detected by the movement vector calculating section 302, and generates a high quality image. The high quality image having clear fingerprint information of the finger and the like is generated as a result of this processing.
(Step S204)

Further, in step S204, the image synthesizing section 303 generates one whole image of a high quality by combining the microlens photographing images improved in image quality with one another. Performed here are the vertical and horizontal inversion processing of the individual microlens photographing images, an image cutout that detects and deletes overlap regions, and image combination processing after the cutout. The high quality image generated by the image synthesizing section 303 is output to the image verifying/registering section 304.
(Steps S205 to S211)

The next processing of steps S205 to S211 is processing performed by the image verifying/registering section 304. The image verifying/registering section 304 is supplied with the high quality image of the finger from the image synthesizing section 303 and performs image verification processing or registration processing.

In step S205, whether processing to be performed is the fingerprint authentication processing or the fingerprint registration processing is determined. This determination can be made according to a setting of an application at the time of processing disclosure or the like.

In a case where the processing to be performed is the fingerprint authentication processing, the processing of steps S206 to S209 is performed.

In a case where the processing to be performed is the fingerprint registration processing, on the other hand, the processing of step S211 is performed.

In the case where the processing to be performed is the fingerprint authentication processing, processing of verifying the high quality image of the finger which high quality image is input from the image synthesizing section 303 against a registered image already stored in the memory 315 is performed in step S206. In a case where the verification is established (step S207=Yes), a verification establishment message is output in step S208, and the processing proceeds to next processing. In a case where the verification is not established (step S207=No), on the other hand, a verification error message is output.

In a case where it is determined in step S205 that the fingerprint registration processing is to be performed, on the other hand, the processing proceeds to step S211, where the high quality image of the finger which high quality image is input from the image synthesizing section 303 is stored as registered information in the memory 315.

(Second Embodiment) an Image Processing Device that Detects an Operation (a Flick, a Swipe, or the Like) of a Finger on a Display Screen Next, an example of configuration and a processing sequence of an image processing device that detects an operation (a flick, a swipe, or the like) of a finger on a display screen will be described as a second embodiment.

Figure 20:
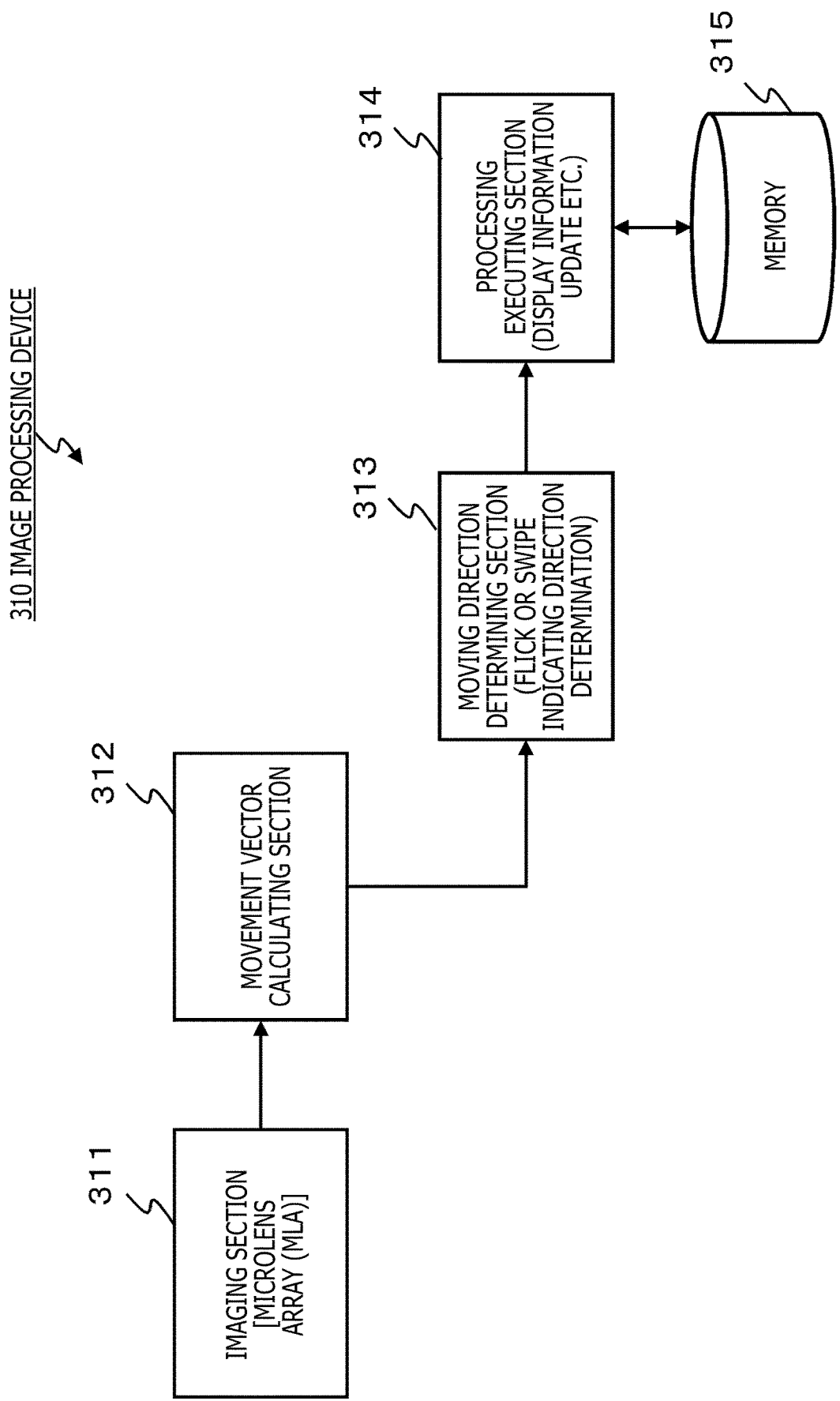
FIG. 20 is a diagram of assistance in explaining an example of a configuration of an image processing device according to the present disclosure.

FIG. 20 is a diagram illustrating an example of configuration of an image processing device 310 according to the present second embodiment.

As illustrated in FIG. 20, the image processing device 310 includes an imaging section 311, a movement vector calculating section 312, a moving direction determining section 313, a processing executing section 314, and the memory 315. Incidentally, the block diagram illustrated in FIG. 20 is a block diagram illustrating only main constituent elements necessary for the processing according to the present disclosure. The image processing device 310 is not limited to the constituent elements illustrated in FIG. 20 but includes, for example, constituent elements such as a control section, a storage section, an input section, and an output section.

Incidentally, the imaging section 311 may be of a configuration separate from the image processing device. In this case, the image processing device 310 is supplied with a captured image of the imaging section 311 via the input section not illustrated and performs processing.

Each constituent section will be described.

The imaging section 311 and the movement vector calculating section 312 perform processing similar to that of the imaging section 301 and the movement vector calculating section 302 described earlier with reference to FIG. 18. That is, the imaging section 311 is an imaging section having a microlens array (MLA). The movement vector calculating section 312 performs the movement vector (optical flow) calculation processing using a large number of microlens photographing images as they are.

A movement vector (optical flow) detected by the movement vector calculating section 312 is input to the moving direction determining section 313.

The moving direction determining section 313 determines a movement direction of a finger of a user by using the movement vector (optical flow) detected by the movement vector calculating section 312. Specifically, the movement direction of the finger in a flick operation or a swipe operation by the finger of the user is determined.

Incidentally, the flick operation is an operation of moving the finger so as to flick the finger on the screen of a smartphone or the like, and the swipe operation is processing of sliding the finger while holding the finger in contact with the screen.

The moving direction determining section 313 determines the movement direction of the finger of the user by using the movement vector (optical flow) detected by the movement vector calculating section 312. The movement vector calculating section 312 calculates a large number of movement vectors in image region units of the microlens photographing images. The moving direction determining section 313 determines the movement direction of the finger of the user by, for example, calculating an average value of the large number of movement vectors or the like.

The moving direction information of the finger of the user which moving direction information is determined by the moving direction determining section 313 is output to the processing executing section 314.

The processing executing section 314 performs processing corresponding to the moving direction of the finger of the user which moving direction is determined by the moving direction determining section 313. The processing is processing corresponding to the flick or swipe operation of the user, such as processing of updating the display screen of the smartphone. Data stored in the memory 315 and an application, for example, are used to perform the processing.

A processing sequence of the image processing device 310 illustrated in this FIG. 20 will be described with reference to a flowchart illustrated in FIG. 21.

Figure 21:
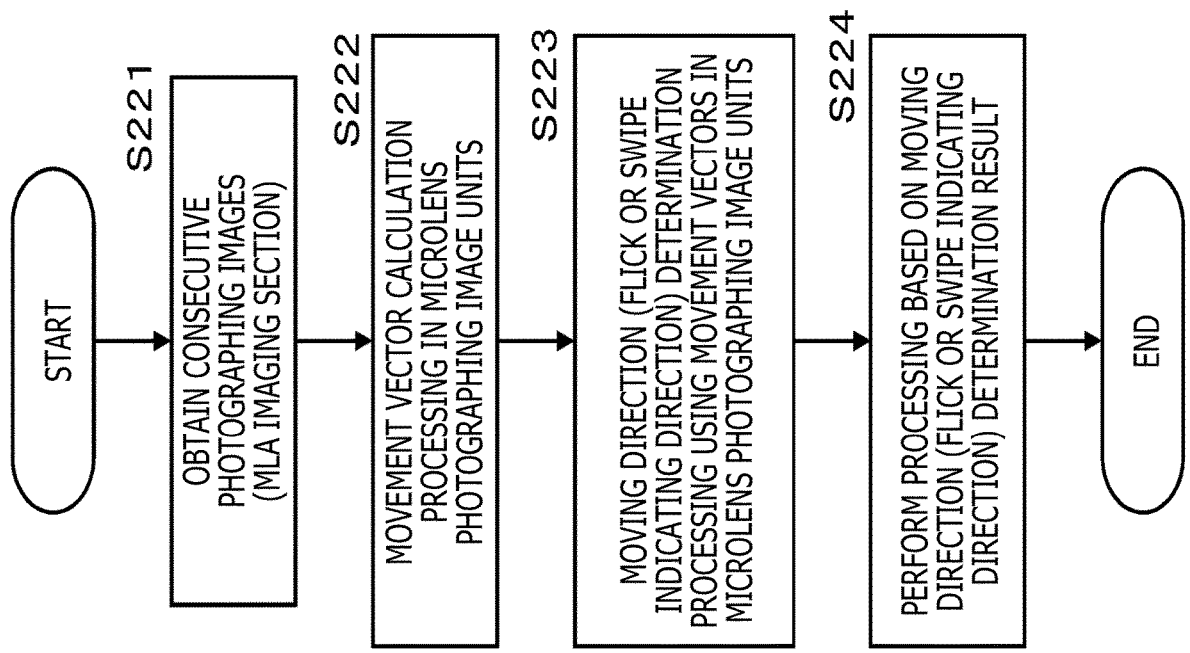
FIG. 21 is a diagram illustrating a flowchart of assistance in explaining a sequence of processing performed by the image processing device according to the present disclosure.

Incidentally, processing according to the flowchart illustrated in FIG. 21 is, for example, processing executable according to a program stored in the storage section of the image processing device, and can be performed under control of a control section (data processing section) including a CPU having a program executing function or the like.

The processing of each step of the flow illustrated in FIG. 21 will be described in order in the following.
(Steps S221 and S222)

The processing of steps S221 and S222 is processing similar to the processing of steps S201 and S202 of the flow described earlier with reference to FIG. 19.

That is, in step S221, consecutive photographing images, that is, a moving image, is photographed.

In this processing, the imaging section 311 of the image processing device 310 illustrated in FIG. 20 photographs the photographing images via a plurality of microlenses. For example, a moving image of a finger of a user when the finger is slid on the screen of the smartphone is photographed.

The moving image as the photographing images of the imaging section 311 is input to the movement vector calculating section 312.

The movement vector calculating section 312 performs the movement vector calculation processing in microlens photographing image units in step S222. The movement vector calculating section 312 performs processing of calculating a movement vector (optical flow) in each frame image of the moving image as the photographing images of the imaging section 311. The movement vector calculating section 312 performs the movement vector (optical flow) calculation processing using a large number of microlens photographing images as they are.

The movement vector (optical flow) detected by the movement vector calculating section 312 is output to the moving direction determining section 313.
(Step S223)

Next, in step S223, moving direction (flick or swipe indicating direction) determination processing using movement vectors in microlens photographing image units is performed. This processing is performed by the moving direction determining section 313 illustrated in FIG. 20.

The moving direction determining section 313 determines a movement direction of the finger of the user by calculating an average value of a large number of movement vectors in image region units of the microlens photographing images which movement vectors are detected by the movement vector calculating section 312 or the like.

The moving direction information of the finger of the user which moving direction information is determined by the moving direction determining section 313 is output to the processing executing section 314.
(Step S224)

Next, in step S224, processing based on a moving direction (flick or swipe indicating direction) determination result is performed. This processing is performed by the processing executing section 314.

The processing executing section 314 performs processing corresponding to the moving direction of the finger of the user which moving direction is determined by the moving direction determining section 313. The processing is, for example, processing corresponding to the flick or swipe operation of the user, such as processing of updating the display screen of the smartphone. Data stored in the memory 315 and an application, for example, are used to perform the processing.

(Third Embodiment) an Image Processing Device that Performs Moving Image Compression Processing An example of configuration and a processing sequence of an image processing device that performs moving image compression processing will next be described as a third embodiment.

Figure 22:
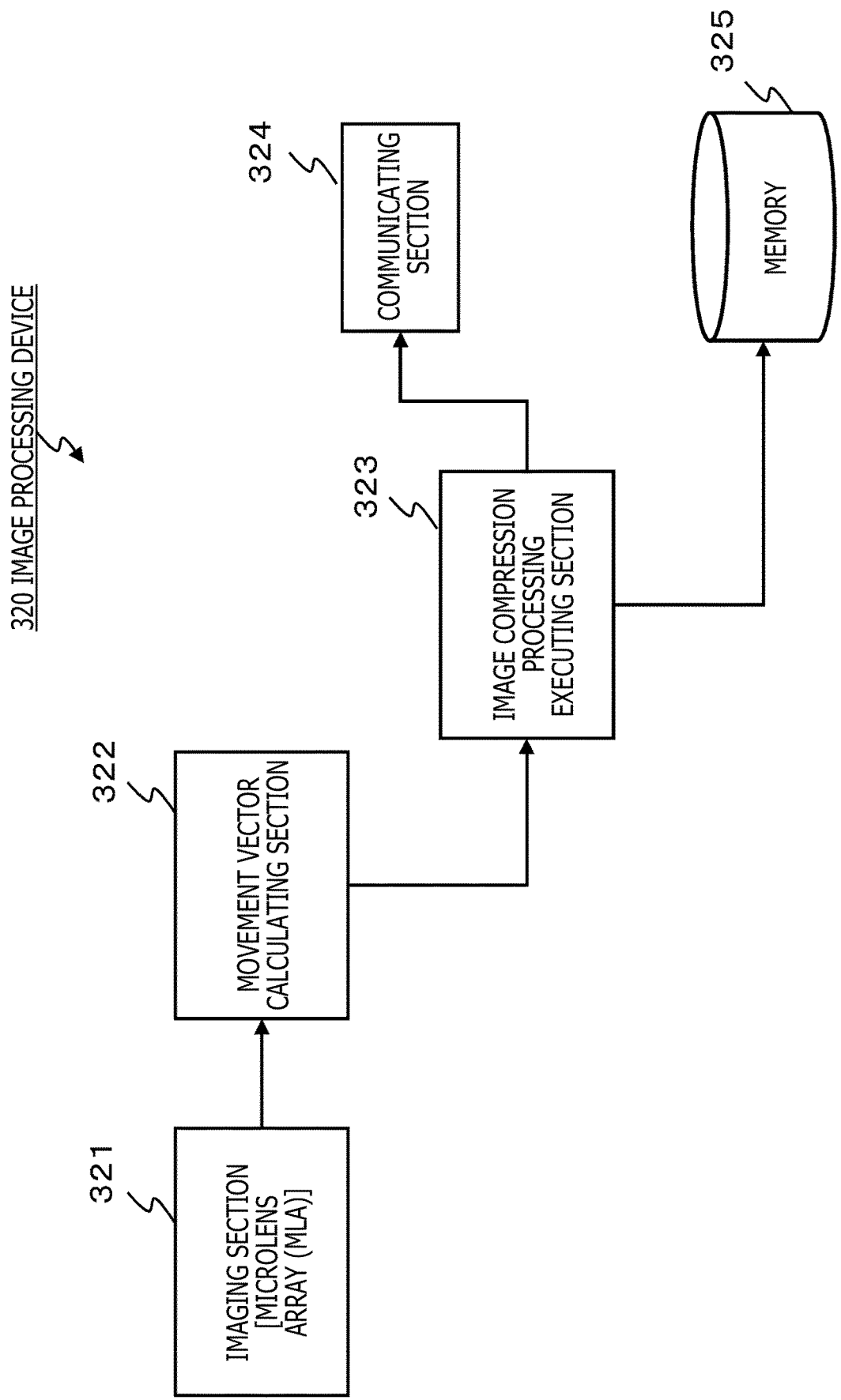
FIG. 22 is a diagram of assistance in explaining an example of a configuration of an image processing device according to the present disclosure.

FIG. 22 is a diagram illustrating an example of configuration of an image processing device 320 according to the present third embodiment.

As illustrated in FIG. 22, the image processing device 320 includes an imaging section 321, a movement vector calculating section 322, an image compression processing executing section 323, a communicating section 324, and a memory 325. Incidentally, the block diagram illustrated in FIG. 22 is a block diagram illustrating only main constituent elements necessary for the processing according to the present disclosure. The image processing device 320 is not limited to the constituent elements illustrated in FIG. 22 but includes, for example, constituent elements such as a control section, a storage section, an input section, and an output section.

Incidentally, the imaging section 321 may be of a configuration separate from the image processing device. In this case, the image processing device 320 is supplied with a captured image of the imaging section 321 via the input section not illustrated and performs processing.

Each constituent section will be described.

The imaging section 321 and the movement vector calculating section 322 perform processing similar to that of the imaging section 301 and the movement vector calculating section 302 described earlier with reference to FIG. 18. That is, the imaging section 321 is an imaging section having a microlens array (MLA). The movement vector calculating section 322 performs the movement vector (optical flow) calculation processing using a large number of microlens photographing images as they are.

A movement vector (optical flow) detected by the movement vector calculating section 322 is input to the image compression processing executing section 323.

The image compression processing executing section 323 performs moving image compression processing using the movement vector (optical flow) detected by the movement vector calculating section 322. Specifically, for example, the moving image compression processing conforming to an MPEG compression algorithm is performed.

The MPEG compression processing performs processing of calculating difference information between different frames and encoding the difference information in order to achieve a high compression ratio. The movement vector is used for this difference calculation. The image compression processing executing section 323 performs the difference calculation using the movement vector (optical flow) detected by the movement vector calculating section 322, thereby performing the MPEG compression processing.

An image compression result of the image compression processing executing section 323 is output to the outside via the communicating section 324. Alternatively, the image compression result of the image compression processing executing section 323 is stored in the memory 325.

Next, a processing sequence of the image processing device 320 illustrated in FIG. 22 will be described with reference to a flowchart illustrated in FIG. 23.

Figure 23:
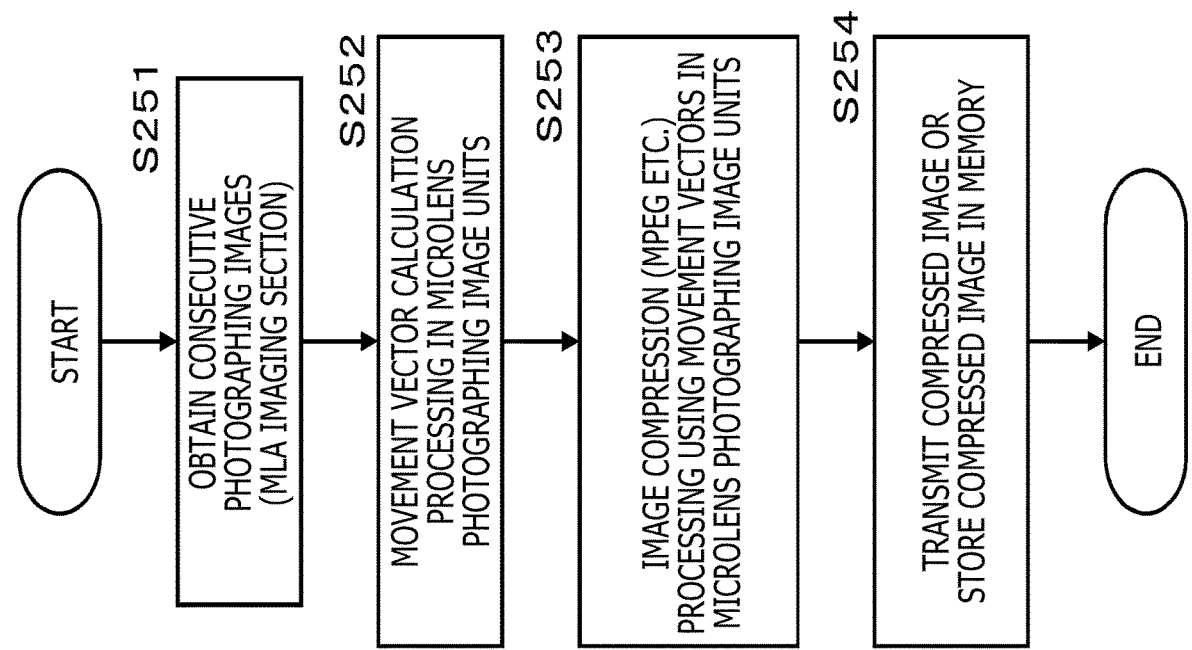
FIG. 23 is a diagram illustrating a flowchart of assistance in explaining a sequence of processing performed by the image processing device according to the present disclosure.

Incidentally, processing according to the flowchart illustrated in FIG. 23 is, for example, processing executable according to a program stored in the storage section of the image processing device, and can be performed under control of a control section (data processing section) including a CPU having a program executing function or the like.

The processing of each step of the flow illustrated in FIG. 23 will be described in order in the following.
(Steps S251 and S252)

The processing of steps S251 and S252 is processing similar to the processing of steps S201 and S202 of the flow described earlier with reference to FIG. 19.

That is, in step S251, consecutive photographing images, that is, a moving image, is photographed.

In this processing, the imaging section 321 of the image processing device 320 illustrated in FIG. 22 photographs the photographing images via a plurality of microlenses. The moving image as the photographing images of the imaging section 321 is input to the movement vector calculating section 322.

The movement vector calculating section 322 performs the movement vector calculation processing in microlens photographing image units in step S252. The movement vector calculating section 322 performs processing of calculating a movement vector (optical flow) in each frame image of the moving image as the photographing images of the imaging section 321. The movement vector calculating section 322 performs the movement vector (optical flow) calculation processing using a large number of microlens photographing images as they are.

The movement vector (optical flow) detected by the movement vector calculating section 322 is output to the image compression processing executing section 323.
(Step S253)

Next, in step S253, image compression (MPEG or the like) processing using movement vectors in microlens photographing image units is performed. This processing is performed by the image compression processing executing section 323 illustrated in FIG. 22.

The image compression processing executing section 323 performs moving image compression processing using the movement vector (optical flow) detected by the movement vector calculating section 322. Specifically, for example, the moving image compression processing conforming to the MPEG compression algorithm is performed. The image compression processing executing section 323 performs difference calculation using the movement vector (optical flow) detected by the movement vector calculating section 322, thereby performing the MPEG compression processing.
(Step S254)

Next, in step S254, an image compression result of the image compression processing executing section 323 is output to the outside via the communicating section 324. Alternatively, the image compression result of the image compression processing executing section 323 is stored in the memory 325.

[6. Concrete Device Examples Using Movement Vector Calculation Processing According to Present Disclosure]

Description will next be made of concrete device examples using the movement vector calculation processing according to the present disclosure.

Figure 24:
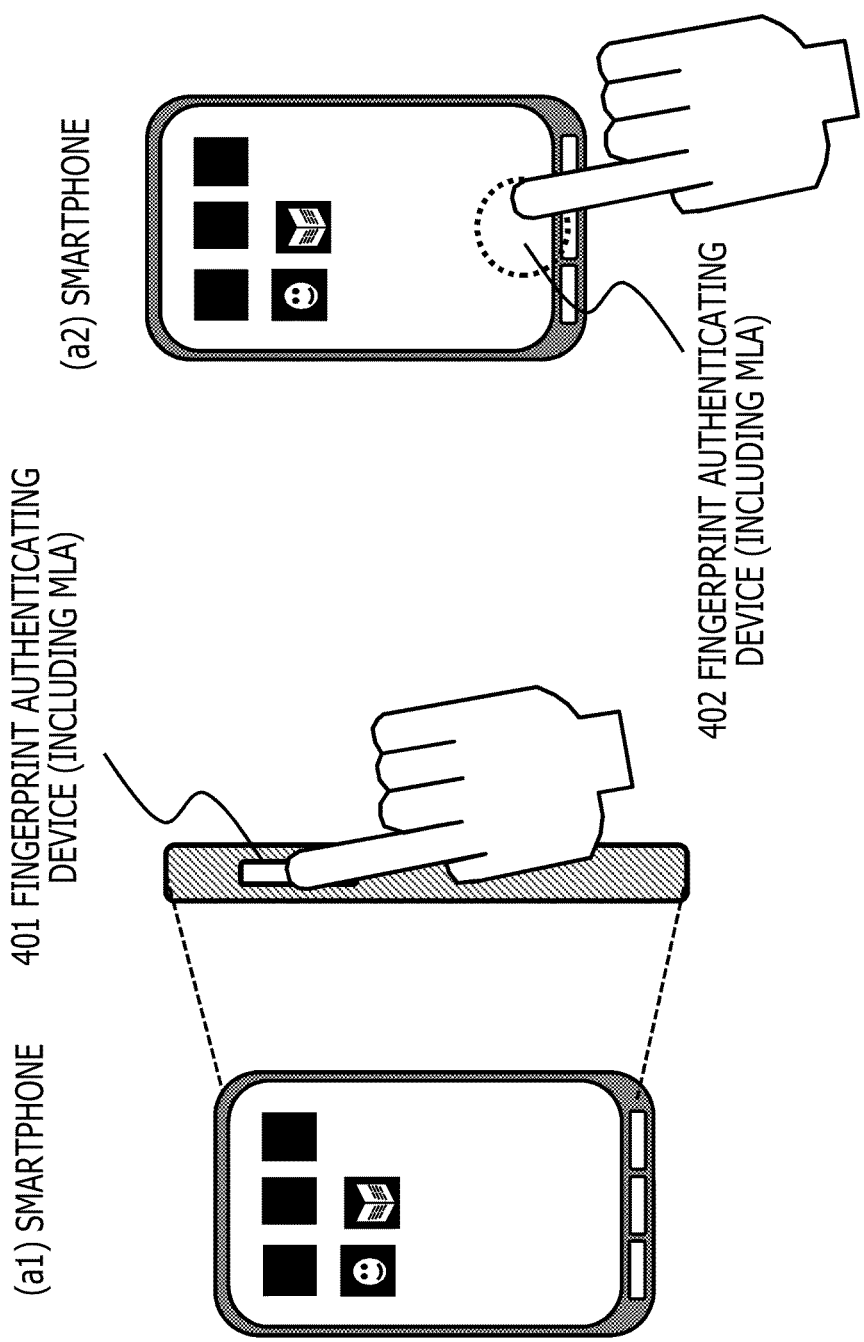
FIG. 24 is a diagram of assistance in explaining concrete examples of devices that perform the movement vector calculation processing according to the present disclosure.

Device examples illustrated in FIG. 24 are examples of fingerprint authenticating devices in smartphones. The figure illustrates configuration examples of a fingerprint authenticating device 401 having an imaging unit formed in a side surface of a smartphone and a fingerprint authenticating device 402 having an imaging unit formed in a lower portion of a front surface of a smartphone.

Each of the imaging units is an imaging unit having a microlens array (MLA).

A device example illustrated in FIG. 25(*b*) is an example of a fingerprint authenticating device in a smart watch as a watch type information processing device. The figure illustrates a configuration example of a fingerprint authenticating device 403 having an imaging unit formed in a front surface of the smart watch.

The imaging unit is an imaging unit having a microlens array (MLA).

A device example illustrated in FIG. 25(*c*) is an example of an imaging device 404 as a close-up high-resolution image photographing camera such as a skin sensor. The imaging unit is an imaging unit having a microlens array (MLA). After movement vector detection in microlens photographing image units as described earlier is performed, a high quality image is generated by alignment to which a detected movement vector is applied and image synthesis processing, and is displayed on a display unit of a PC or the like.

Figure 26:
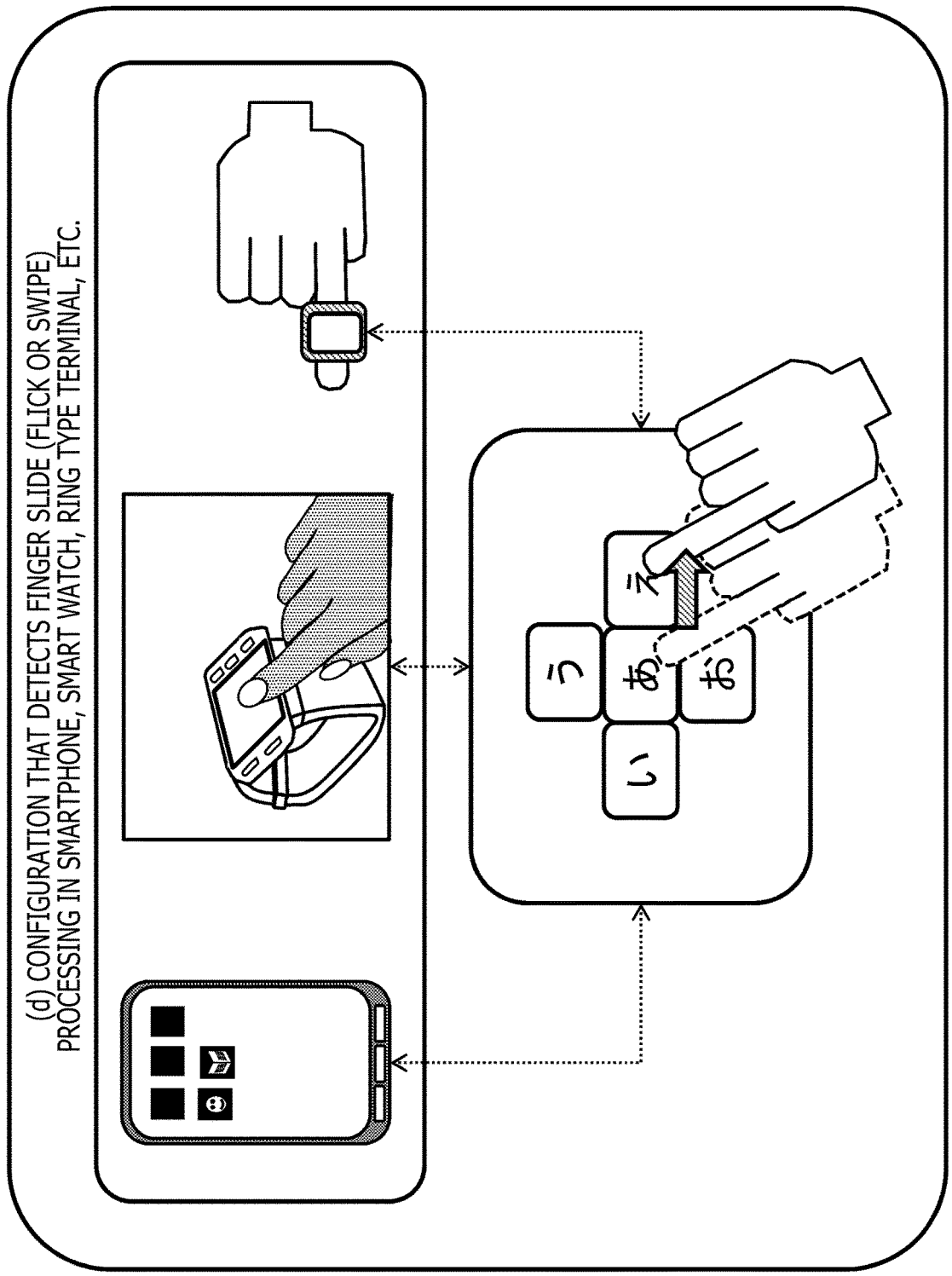
FIG. 26 is a diagram of assistance in explaining concrete examples of devices that perform the movement vector calculation processing according to the present disclosure.

FIG. 26 illustrates concrete device configuration examples for processing of detecting a movement of a finger of a user such as a flick or swipe operation as described earlier with reference to FIG. 20 and FIG. 21.

A device that performs high-speed and high-accuracy moving direction detection is implemented by applying the movement vector detection according to the present disclosure to a configuration for performing character input by a flick operation as illustrated in a lower part of FIG. 26, for example, in a smartphone, a smart watch, or a ring type terminal.

[7. Example of Hardware Configuration of Image Processing Device]

Next, an example of hardware configuration of the image processing device will be described with reference to FIG. 27.

Figure 27:
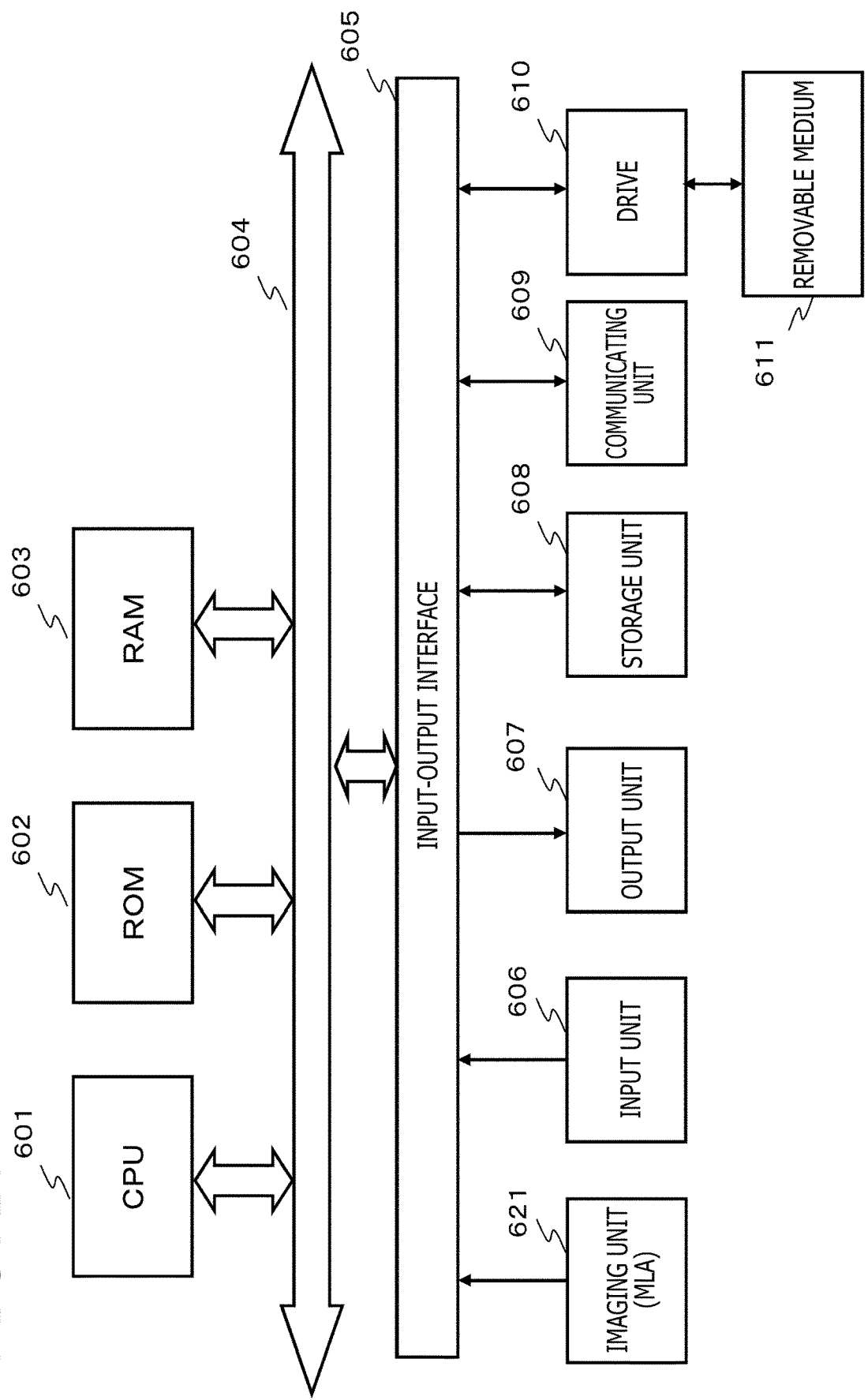
FIG. 27 is a diagram of assistance in explaining an example of hardware configuration of the image processing device.

FIG. 27 is a diagram illustrating an example of hardware configuration of the image processing device that performs the processing according to the present disclosure.

A CPU (Central Processing Unit) 601 functions as a control unit or a data processing unit that performs various kinds of processing according to a program stored in a ROM (Read Only Memory) 602 or a storage unit 608. For example, processing according to the sequences described in the foregoing embodiments is performed. A RAM (Random Access Memory) 603 stores the program executed by the CPU 601, data, and the like. The CPU 601, the ROM 602, and the RAM 603 are interconnected by a bus 604.

The CPU 601 is connected to an input-output interface 605 via the bus 604. Connected with the input-output interface 605 are an imaging unit 621 having a microlens array, an input unit 606 including various kinds of switches capable of user input, a keyboard, a mouse, a microphone, and the like, and an output unit 607 that performs data output to a display unit, a speaker, or the like. The CPU 601 performs various kinds of processing in response to commands input from the input unit 606 and outputs a processing result to the output unit 607, for example.

The storage unit 608 connected to the input-output interface 605, for example, includes a hard disk or the like. The storage unit 608 stores the program executed by the CPU 601 and various kinds of data. A communicating unit 609 communicates with an external device by functioning as a transmitting and receiving unit in Wi-Fi communication, Bluetooth (registered trademark) (BT) communication, and other data communication via a network such as the Internet or a local area network.

A drive 610 connected to the input-output interface 605 records or reads data by driving a removable medium 611 including a magnetic disk, an optical disk, a magneto-optical disk, a semiconductor memory such as a memory card, or the like.

[8. Summary of Configuration According to Present Disclosure]

Embodiments of the present disclosure have been explained above in detail with reference to particular embodiments. However, it is obvious that those skilled in the art can make modifications and substitutions in the embodiments without departing from the spirit of the present disclosure. That is, the present invention has been disclosed in an illustrative form and is not to be construed in a limited manner. In order to determine the gist of the present disclosure, the section of claims is to be considered.

Incidentally, the technology disclosed in the present specification can adopt the following configurations.

(1)

An image processing device including:

a movement vector calculating section configured to receive, as an input, consecutive photographing images of an imaging section having a microlens array and calculate a movement vector between the images, the movement vector calculating section calculating the movement vector corresponding to a feature point by using microlens photographing images photographed by respective microlenses included in the microlens array.

(2)

The image processing device according to (1), in which the movement vector calculating section performs, as different processing, processing of calculating the movement vector corresponding to the feature point within duplicate image regions having the same image region within a plurality of microlens photographing images, and processing of calculating the movement vector corresponding to the feature point within a single image region not having the same image region within a plurality of microlens photographing images.

(3)

The image processing device according to (2), in which when the movement vector calculating section calculates the movement vector corresponding to the feature point within the duplicate image regions, the movement vector calculating section calculates an average value of a plurality of movement vectors corresponding to the same feature point and sets the average value as the movement vector of the feature point.

(4)

The image processing device according to (2) or (3), in which when the movement vector calculating section calculates the movement vector corresponding to the feature point within the duplicate image regions, the movement vector calculating section calculates an average value of a plurality of movement vectors remaining after an outlier (abnormal value) is excluded among a plurality of movement vectors corresponding to the same feature point, and sets the average value as the movement vector of the feature point.

(5)
The image processing device according to any one of (1) to (4), in which
the movement vector calculating section distinguishes
a single image region not having the same image region within a plurality of microlens photographing images, and
duplicate image regions having the same image region within a plurality of microlens photographing images,
for the duplicate image regions, the movement vector calculating section further distinguishes
two-image duplicate regions having two identical image regions, and
four-image duplicate regions having four identical image regions, and
the movement vector calculating section performs movement vector calculation processing different in each region unit.

(6)
The image processing device according to any one of (1) to (5), in which
as movement vector calculation processing corresponding to a feature point detected from a microlens photographing image photographed by each microlens in an outermost circumference region of the microlens array, among the microlens photographing images photographed by the respective microlenses included in the microlens array, the movement vector calculating section performs exception processing different from the movement vector calculation processing corresponding to feature points detected from other microlens photographing images.

(7)
The image processing device according to any one of (1) to (6), in which
the movement vector calculating section performs different movement vector calculation processing according to whether or not there are duplicate image regions within a plurality of microlens photographing images, and according to the number of duplications in a case where there are duplicate image regions.

(8)
The image processing device according to any one of (1) to (7), in which
the movement vector calculating section performs a feature point search after setting a search range in which a position of a microlens included in the microlens array and a manner of image inversion are taken into consideration.

(9)
The image processing device according to (8), in which
the movement vector calculating section performs the feature point search after setting the search range in which image duplicate regions are further taken into consideration.

(10)
The image processing device according to any one of (1) to (9), further including:
an image synthesizing section configured to perform synthesis processing of the consecutive photographing images of the imaging section by using the movement vector calculated by the movement vector calculating section.

(11)
The image processing device according to (10), in which
the image synthesizing section aligns each of consecutive photographing microlens photographing images photographed by the respective microlenses included in the microlens array, by using the movement vector calculated by the movement vector calculating section, and performs synthesis processing of each of the consecutive photographing microlens photographing images.

(12)
The image processing device according to (10) or (11), in which
the consecutive photographing images of the imaging section include finger images including a fingerprint of a person, and
the image processing device further includes an image verifying section configured to perform processing of verification against a registered fingerprint image by using a synthetic image generated by the image synthesizing section.

(13)
An image processing device for performing fingerprint authentication processing, the image processing device including:
a movement vector calculating section configured to receive, as an input, consecutive photographing images of a finger photographed by an imaging section having a microlens array and calculate a movement vector between the images;
an image synthesizing section configured to generate a high quality image by synthesis processing of the consecutive photographing images by using the movement vector calculated by the movement vector calculating section; and
an image verifying section configured to perform processing of verifying a synthetic image generated by the image synthesizing section against a registered fingerprint image stored in a storage section in advance.

(14)
The image processing device according to (13), in which
the movement vector calculating section calculates the movement vector corresponding to a feature point by using microlens photographing images photographed by respective microlenses included in the microlens array, and
the image synthesizing section aligns each of consecutive photographing microlens photographing images photographed by the respective microlenses included in the microlens array, by using the movement vector calculated by the movement vector calculating section, and performs synthesis processing of each of the consecutive photographing microlens photographing images.

(15)
An image processing method performed in an image processing device, the image processing method including:
by a movement vector calculating section, a movement vector calculating step of receiving, as an input, consecutive photographing images of an imaging section having a microlens array and calculating a movement vector between the images, in which
the movement vector calculating step includes a step of calculating the movement vector corresponding to a feature point by using microlens photographing images photographed by respective microlenses included in the microlens array.

(16)
An image processing method for performing fingerprint authentication processing in an image processing device, the image processing method including:
by a movement vector calculating section, a movement vector calculating step of receiving, as an input, consecutive photographing images of a finger photographed by an imaging section having a microlens array and calculating a movement vector between the images;
by an image synthesizing section, an image synthesizing step of generating a high quality image by synthesis processing of the consecutive photographing images by using the movement vector calculated by the movement vector calculating section; and by an image verifying section, an image verifying step of performing processing of verifying a synthetic image generated by the image synthesizing section against a registered fingerprint image stored in a storage section in advance.

(17)

A program for making image processing performed in an image processing device, the program including:

making a movement vector calculating section perform a movement vector calculating step of receiving, as an input, consecutive photographing images of an imaging section having a microlens array and calculating a movement vector between the images, in which in the movement vector calculating step, processing of calculating the movement vector corresponding to a feature point by using microlens photographing images photographed by respective microlenses included in the microlens array is made to be performed.

(18)

A program for making fingerprint authentication processing performed in an image processing device, the program including:

making a movement vector calculating section perform a movement vector calculating step of receiving, as an input, consecutive photographing images of a finger photographed by an imaging section having a microlens array and calculating a movement vector between the images;

making an image synthesizing section perform an image synthesizing step of generating a high quality image by synthesis processing of the consecutive photographing images by using the movement vector calculated by the movement vector calculating section; and making an image verifying section perform an image verifying step of performing processing of verifying a synthetic image generated by the image synthesizing section against a registered fingerprint image stored in a storage section in advance.

In addition, a series of processing described in the specification can be performed by hardware, software, or a composite configuration of hardware and software. In a case where the processing is performed by software, the processing can be performed after a program in which a processing sequence is recorded is installed in a memory within a computer incorporated in dedicated hardware, or the processing can be performed after the program is installed in a general-purpose computer capable of performing various kinds of processing. For example, the program can be recorded on a recording medium in advance. In addition to being installed from a recording medium to a computer, the program can be received via a network such as a LAN (Local Area Network) or the Internet, and installed on a recording medium such as a built-in hard disk.

Incidentally, the various kinds of processing described in the specification may be not only performed in time series according to the description but also performed in parallel or individually according to the processing power of a device performing the processing or as required. In addition, a system in the present specification is a logical set configuration of a plurality of devices and is not limited to a system in which the devices of respective configurations are located within the same casing.

INDUSTRIAL APPLICABILITY

As described above, according to a configuration based on one embodiment of the present disclosure, a device and a method are implemented which perform movement vector calculation processing from photographing images for which a microlens array is used without generating whole images.

Specifically, for example, consecutive photographing images photographed by an imaging section having a microlens array are input, and a movement vector between the images is calculated. A movement vector calculating section calculates the movement vector corresponding to a feature point by using microlens photographing images photographed by respective microlenses. When the movement vector corresponding to the feature point within duplicate image regions having the same image region within a plurality of microlens photographing images is calculated, an average value of a plurality of movement vectors corresponding to the same feature point is calculated and is set as the movement vector of the feature point. Alternatively, an average value of plural movement vectors remaining after an outlier (abnormal value) is excluded is calculated and is set as the movement vector of the feature point.

A device and a method that perform movement vector calculation processing from photographing images for which a microlens array is used without generating whole images are implemented by these pieces of processing.

REFERENCE SIGNS LIST

10 Microlens array (MLA)
11 Microlens
12 Image sensor (imaging element)
101 Microlens photographing image
300 Image processing device
301 Imaging section
302 Movement vector calculating section
303 Image synthesizing section
304 Image verifying/registering section
305 Memory
310 Image processing device
311 Imaging section
312 Movement vector calculating section
313 Moving direction determining section
314 Processing executing section
315 Memory
320 Image processing device
321 Imaging section
322 Movement vector calculating section
323 Image compression processing executing section
324 Communicating section
325 Memory
401, 402, 403 Fingerprint authenticating device
404 Imaging device
601 CPU
602 ROM
603 RAM
604 Bus
605 Input-output interface
606 Input unit
607 Output unit
608 Storage unit
609 Communicating unit
610 Drive
611 Removable medium
621 Imaging unit

The invention claimed is:

1. An image processing device comprising:
a movement vector calculating section configured to
receive, as an input, consecutive photographing images of an imaging assembly having a microlens array and calculate a movement vector between the images,
calculate the movement vector corresponding to a feature point by using microlens photographing images photographed by respective microlenses included in the microlens array, and
perform different movement vector calculation processing according to whether or not there are duplicate image regions within a plurality of microlens photographing images,
wherein the movement vector calculating section is implemented via at least one processor.

2. The image processing device according to claim 1, wherein
the movement vector calculating section is further configured to perform, as different processing,
processing of calculating the movement vector corresponding to the feature point within duplicate image regions having a same image region within a plurality of microlens photographing images, and
processing of calculating the movement vector corresponding to the feature point within a single image region not having a same image region within a plurality of microlens photographing images.

3. The image processing device according to claim 2, wherein
when the movement vector calculating section calculates the movement vector corresponding to the feature point within the duplicate image regions, the movement vector calculating section is further configured to calculate an average value of a plurality of movement vectors corresponding to a same feature point and set the average value as the movement vector of the feature point.

4. The image processing device according to claim 2, wherein
when the movement vector calculating section is further configured to
calculate the movement vector corresponding to the feature point within the duplicate image regions,
calculate an average value of a plurality of movement vectors remaining after an outlier (abnormal value) is excluded among a plurality of movement vectors corresponding to a same feature point, and
set the average value as the movement vector of the feature point.

5. The image processing device according to claim 1, wherein
the movement vector calculating section is further configured to
distinguish a single image region not having a same image region within a plurality of microlens photographing images, and duplicate image regions having a same image region within a plurality of microlens photographing images,
for the duplicate image regions, distinguish two-image duplicate regions having two identical image regions, and four-image duplicate regions having four identical image regions, and
perform movement vector calculation processing different in each region unit.

6. The image processing device according to claim 1, wherein
as movement vector calculation processing corresponding to a feature point detected from a microlens photographing image photographed by each microlens in an outermost circumference region of the microlens array, among the microlens photographing images photographed by the respective microlenses included in the microlens array, the movement vector calculating section is further configured to perform exception processing different from the movement vector calculation processing corresponding to feature points detected from other microlens photographing images.

7. The image processing device according to claim 1, wherein
the movement vector calculating section is further configured to perform the different movement vector calculation processing according to a number of duplications in a case where there are duplicate image regions.

8. The image processing device according to claim 1, wherein
the movement vector calculating section is further configured to perform a feature point search after setting a search range in which a position of a microlens included in the microlens array and a manner of image inversion are taken into consideration.

9. The image processing device according to claim 8, wherein
the movement vector calculating section is further configured to perform the feature point search after setting the search range in which image duplicate regions are further taken into consideration.

10. The image processing device according to claim 1, further comprising:
an image synthesizing section configured to perform synthesis processing of the consecutive photographing images of the imaging assembly by using the movement vector calculated by the movement vector calculating section,
wherein the image synthesizing section is implemented via at least one processor.

11. The image processing device according to claim 10, wherein
the image synthesizing section is further configured to align each of consecutive photographing microlens photographing images photographed by the respective microlenses included in the microlens array, by using the movement vector calculated by the movement vector calculating section, and
perform synthesis processing of each of the consecutive photographing microlens photographing images.

12. The image processing device according to claim 10, wherein
the consecutive photographing images of the imaging assembly include finger images including a fingerprint of a person, and
the image processing device further includes an image verifying section configured to perform processing of verification against a registered fingerprint image by using a synthetic image generated by the image synthesizing section,
the image verifying section is implemented via at least one processor.

13. An image processing device for performing fingerprint authentication processing, the image processing device comprising:

a movement vector calculating section configured to
receive, as an input, consecutive photographing images of a finger photographed by an imaging assembly having a microlens array and calculate a movement vector between the images, and
perform different movement vector calculation processing according to whether or not there are duplicate image regions within a plurality of microlens photographing images;
an image synthesizing section configured to generate a high quality image by synthesis processing of the consecutive photographing images by using the movement vector calculated by the movement vector calculating section; and
an image verifying section configured to perform processing of verifying a synthetic image generated by the image synthesizing section against a registered fingerprint image stored in a storage section in advance,
wherein the movement vector calculating section, the image synthesizing section, the image verifying section, and the storage section are each implemented via at least one processor.

14. The image processing device according to claim 13, wherein
the movement vector calculating section is further configured to calculate the movement vector corresponding to a feature point by using microlens photographing images photographed by respective microlenses included in the microlens array, and
the image synthesizing section is further configured to
align each of consecutive photographing microlens photographing images photographed by the respective microlenses included in the microlens array, by using the movement vector calculated by the movement vector calculating section, and
perform synthesis processing of each of the consecutive photographing microlens photographing images.

15. An image processing method performed in an image processing device, the image processing method comprising:
receiving, as an input, consecutive photographing images of an imaging assembly having a microlens array and calculating a movement vector between the images;
calculating the movement vector corresponding to a feature point by using microlens photographing images photographed by respective microlenses included in the microlens array; and
performing different movement vector calculation processing according to whether or not there are duplicate image regions within a plurality of microlens photographing images.

16. An image processing method for performing fingerprint authentication processing in an image processing device, the image processing method comprising:
receiving, as an input, consecutive photographing images of a finger photographed by an imaging assembly having a microlens array and calculating a movement vector between the images;
performing different movement vector calculation processing according to whether or not there are duplicate image regions within a plurality of microlens photographing images;
generating a high quality image by synthesis processing of the consecutive photographing images by using the movement vector; and
performing processing of verifying a synthetic image against a registered fingerprint image stored in a storage in advance.

17. A non-transitory computer-readable medium having embodied thereon a program, which when executed by a computer causes the computer to execute a method for making image processing performed in an image processing device, the method comprising:
receiving, as an input, consecutive photographing images of an imaging assembly having a microlens array and calculating a movement vector between the images;
calculating the movement vector corresponding to a feature point by using microlens photographing images photographed by respective microlenses included in the microlens array is made to be performed; and
performing different movement vector calculation processing according to whether or not there are duplicate image regions within a plurality of microlens photographing images.

18. A non-transitory computer-readable medium having embodied thereon a program, which when executed by a computer causes the computer to execute a method for making fingerprint authentication processing performed in an image processing device, the method comprising:
receiving, as an input, consecutive photographing images of a finger photographed by an imaging assembly having a microlens array and calculating a movement vector between the images;
performing different movement vector calculation processing according to whether or not there are duplicate image regions within a plurality of microlens photographing images;
generating a high quality image by synthesis processing of the consecutive photographing images by using the movement vector; and
performing processing of verifying a synthetic image against a registered fingerprint image stored in a storage in advance.

* * * * *